United States Patent [19]
Byers et al.

[11] Patent Number: 5,524,218
[45] Date of Patent: Jun. 4, 1996

[54] DEDICATED POINT TO POINT FIBER OPTIC INTERFACE

[75] Inventors: Larry L. Byers, Apple Valley; Donald M. Davies, Shoreview; Joseba M. Desubijana, Minneapolis; Michael E. Mayer, Rudyard; Randall L. Piper, Plymouth; Lloyd E. Thorsbakken, Blaine; Steven M. Wierdsma, Andover, all of Minn.

[73] Assignee: Unisys Corporation, Blue Bell, Pa.

[21] Appl. No.: 172,652

[22] Filed: Dec. 23, 1993

[51] Int. Cl.$^6$ ........................................ G06F 3/00
[52] U.S. Cl. .............. 395/309; 364/238.5; 364/238.3; 364/229; 364/232.5; 364/DIG. 1
[58] Field of Search ................................ 395/800, 200, 395/309, 200.01, 550

[56] References Cited

U.S. PATENT DOCUMENTS

| | | | |
|---|---|---|---|
| 4,783,137 | 11/1988 | Kosman | 350/96.16 |
| 4,908,823 | 3/1990 | Haagens | 370/85.1 |
| 5,058,132 | 10/1991 | Li | 375/38 |
| 5,068,854 | 11/1991 | Chandran | 371/37.1 |
| 5,150,244 | 9/1992 | Cecchini | 359/113 |
| 5,379,386 | 1/1995 | Swartz | 395/309 |

OTHER PUBLICATIONS

National Semiconductor Corp., "Fiber Distributed Data Interface (FDDI) Databook", 1991, pp. 1-3 to 1-11, 4-158 to 4-159.

S. A. Calta, et. al., "Enterprise Systems Connection (ESCON) Architecture–System Overview", IBM J.Res.Develop. Jul. 1992, pp. 535–551.
J. C. Elliott, et. al., "The IBM ESCON Architecture", IBM J.Res.Develop. Jul. 1992, pp. 577–591.
C. J. Georgiou, et. al., "The IBM ESCON Director: A Dynamic Switch For 200Mb/s Fiber Optic Links", IBM J.Res.Develop. Jul. 1992, pp. 593–616.
J. R. Flanagan, et. al., "The IBM ESCON Channel— A Versatile Building Block", IBM J.Res.Develop. Jul. 1992, pp. 617–632.
J. J. Coleman, et. al., "Fiber Distributed Data Interface Attachment to System/390", IBM J.Res.Develop. Jul. 1992, pp. 647–654.

*Primary Examiner*—Eric Coleman
*Attorney, Agent, or Firm*—Steven P. Skabrat; Charles A. Johnson; Mark T. Starr

[57] ABSTRACT

A system for communicating data between a main processor and a peripheral processor over a fiber optic interface. The interface is a dedicated, point-to-point link operating in full-duplex, asynchronous mode. Dual fibers and physical layer controllers are used in a cascaded fashion to double the throughput of the interface. Frame control logic coordinates formatting of data into frames for transmission over the interface. Frame format and interface protocol are based on FDDI, but are improved to more efficiently transfer data in a point-to-point implementation. Frame Check Sequences are generated and verified to ensure error-free data transfers. Frame sending and frame receiving logic communicate with the main and peripheral processors, accepting data transfer requests and forwarding received data.

22 Claims, 24 Drawing Sheets

| SYMBOL | 4B CODE | 5B CODE | SYMBOL | 4B CODE | 5B CODE |
|---|---|---|---|---|---|
| 0 | 0000 | 11110 | C | 1100 | 11010 |
| 1 | 0001 | 01001 | D | 1101 | 11011 |
| 2 | 0010 | 10100 | E | 1110 | 11100 |
| 3 | 0011 | 10101 | F | 1111 | 11101 |
| 4 | 0100 | 01010 | N | 0000 | 11110 |
| 5 | 0101 | 01011 | | | 11111 OR |
| 6 | 0110 | 01110 | ⌒JK | 1101 | 11000 AND |
| 7 | 0111 | 01111 | 234 | | 10001 |
| 8 | 1000 | 10010 | ⌒T | 0100 | |
| 9 | 1001 | 10011 | 236 | 0101 OR | 01101 |
| A | 1010 | 10110 | UNUSED | 0110 | 00111 |
| B | 1011 | 10111 | UNUSED | 0111 | 11001 |

FIG. 7

| SYMBOL | 5B CODE | 4B CODE | SYMBOL | 4B CODE | 5B CODE |
|---|---|---|---|---|---|
| 0 | 11110 | 0000 | C | 11010 | 1100 |
| 1 | 01001 | 0001 | D | 11011 | 1101 |
| 2 | 10100 | 0010 | E | 11100 | 1110 |
| 3 | 10101 | 0011 | 242 F | 11101 | 1111 |
| 4 | 01010 | 0100 | 244 I | 11111 | 1010 |
| 5 | 01011 | 0101 | 234 H | 00100 | 0001 |
| 6 | 01110 | 0110 | JK | 11000 AND | |
| 7 | 01111 | 0111 | 236 | 10001 | 1101 |
| 8 | 10010 | 1000 | T | 01101 | 0101 |
| 9 | 10011 | 1001 | UNUSED | 00111 | 0110 |
| A | 10110 | 1010 | UNUSED | 11001 | 0111 |
| B | 10111 | 1011 | 246 Q | 0000 | 0010 |

FIG. 8

FRAME CONTROL FIELD 478

| MAJOR CATEGORY | SUB-CATEGORY |
|---|---|
| BIT 0 = 36-BIT MODE DATA | BIT 4 = PARTIAL TRANSMISSION<br>BIT 5 = LAST TRANSMISSION<br>BIT 6 = ABORT TRANSFER<br>BIT 7 = NOT USED |
| BIT 1 = 32-BIT MODE DATA | BIT 4 = PARTIAL TRANSMISSION<br>BIT 5 = LAST TRANSMISSION<br>BIT 6 = ABORT TRANSFER<br>BIT 7 = NOT USED |
| BIT 2 = ACB TRANSFER | BIT 4 = COMMAND/STATUS<br>BIT 5 = RECONNECT READ<br>BIT 6 = RECONNECT WRITE<br>BIT 7 = UPI MESSAGE |
| BIT 3 = ACKNOWLEDGE/<br>NEGATIVE ACKNOWLEDGE | BIT 4 = ACKNOWLEDGE<br>BIT 5 = NEGATIVE ACK.<br>BIT 6 = FATAL ERROR<br>BIT 7 = CONTACT FRAME |

FIG. 16

DEDICATED POINT TO POINT FIBER OPTIC INTERFACE

BACKGROUND OF THE INVENTION

1. Field of the Invention

This invention relates generally to communications within a computer system. More specifically, it relates to a fiber optic interface between a main processor and a peripheral processor.

2. Background Information

Many computer systems contain multiple peripheral devices in order to increase their processing power. The main processors of the computer system must communicate with the peripherals in an efficient and reliable manner. In a large computer system such as the 2200/900 computer, available from Unisys Corporation, there may be configured many mass storage devices. The Input/Output (I/O) channels between the main processors and these peripherals are physically composed of cables containing hard-wired conductors. Access time to the peripherals over the cables is a critical issue when analyzing the overall performance of the computer system. As processor performance has increased, the bandwidth and throughput of wire cables has become a bottleneck for system performance. The advent of fiber optic communications technology promises an attractive solution to the I/O bandwidth and throughput problem.

The use of fiber optics as an interconnection medium between a main processor and peripheral processors provides a number of benefits. Most importantly, it provides substantially higher data transfer rates and longer transmission distances compared with wire buses traditionally used for I/O interfaces. In addition, fiber optic interfaces have very high noise immunity and low error rates. Cable bulk is also reduced and connector reliability is enhanced. Recently the cost of fiber optic technology has been reduced to the point where the use of reliable, efficient fiber optic links between processors is a good overall design choice for an I/O interface. But the use of cumbersome standards such as the Fiber Distributed Data Interface (FDDI) standard may not satisfy requirements for minimizing protocol overhead. The FDDI standard, which is primarily used for token ring local area networks (LANs), is overly complex and subject to change only by committee. In addition, the FDDI token ring protocol operates effectively only in a half-duplex mode. A more streamlined, flexible approach with increased throughput for point-to-point fiber optic communications is needed.

There are prior art systems that use fiber optic interfaces. In Cecchini, U.S. Pat. No. 5,150,244 there is disclosed an interface for connecting two independent half-duplex networks. This interface is essentially a fiber optic bridge between two local-area networks. This prior art system is deficient in that it only provides half-duplex communications and only interconnects separate networks rather than directly coupling a main processor and a peripheral processor. As such it has limited applicability to a variety of device interconnection problems.

The July 1992 issue of the IBM Journal of Research and Development describes the Enterprise Systems Connection (ESCON) architecture used to connect processors and peripherals in the IBM System/390 family of computer systems. The ESCON architecture uses fiber optic serial-I/O channels to pass messages between devices in the system. The ESCON architecture employs a dynamic crosspoint switch as an interconnection topology rather than a dedicated point-to-point topology as is needed for a single main processor to peripheral processor coupling. Thus, ESCON uses extra processing time to perform path and message switching, which is unnecessary in a dedicated point-to-point application. Interoperability is also a concern with the ESCON architecture. Although it implements the FDDI standard, it does not support cascaded operations to transfer multiple bytes of data packets in parallel. Finally, the ESCON architecture is designed to work in a network environment so its complex protocol is not streamlined to provide maximum efficiency in a dedicated point-to-point application.

SUMMARY OF THE INVENTION

An object of this invention is to improve the bandwidth in transferring data between a host computer system and a peripheral device by utilizing a fiber optic link.

Another object of this invention is to improve the throughput provided by a communications path between a host computer system and a file cache system by utilizing a dedicated point-to-point fiber optic interface based on the FDDI standard compliant components.

Still another object of this invention is to improve the reliability of a communications path between a host computer system and a file cache system by utilizing a dedicated point-to-point fiber optic interface based on the FDDI standard.

Another object of this invention is to reduce the physical bulk of the communication media and increase the allowable distance between a main processor and a peripheral processor by utilizing a point-to-point fiber optic interface.

Yet another object of this invention is to improve the bandwidth of data transfer provided by a communications path between a host computer system and a file cache system by using two fiber optic links operating in a cascade mode to double the amount of data that can be transferred per unit of time.

Another object of the present invention is to improve the bandwidth of data transfer while operating in a cascaded mode of operation by transmitting the even bytes of a data packet on one fiber optic link and the odd bytes of a data packet on a second fiber optic link, both bytes being transmitted in parallel.

Still another object of the present invention is to improve the reliability of a communications path between a host computer system and a file cache system by performing redundant frame check sequences on frames of data transferred over dual fiber optic links.

Another object of tile present invention is to improve the performance of a communications path between a host computer system and a file cache system by providing asynchronous, full-duplex, transfers of data.

Yet another object of this invention is to improve the performance of a FDDI-based system by tailoring the transmission protocol to more efficiently support a dedicated point-to-point application.

Additional objects, advantages and novel features of the invention will be set forth in part in the description which follows, and in pan will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a communications architecture and associated protocol that provides increased throughput, bandwidth, and error detection capabilities by utilizing fiber optic technology based on the FDDI standard in a full-duplex, asynchronous, dedicated point-to-point interface.

In accordance with an aspect of this invention, the system, designed for communicating data packets between two ends of a dedicated point-to-point fiber optic interface, comprises at least two fiber optic link pairs, each pair including a send link and a receive link. Each end of each fiber optic link pair has a physical layer controller coupled to it. A frame control logic section is coupled to all physical layer controllers at each end of the fiber optic links. The frame control logic synchronizes, reformats, encodes, decodes, and transfers the data packets to and from the physical layer controllers. A frame send logic section is coupled to each frame control logic section and a source. The frame send logic receives data packets from the source, buffers them, and transfers the data packets to the frame control logic. A frame receive logic section is coupled to each frame control logic section, a destination, and the frame send logic. The frame receive logic receives data packets from the frame control logic, buffers them, and transfers the data packets to the destination.

In accordance with another aspect of the invention, a method for sending data packets from a source to a destination over a dedicated point-to-point fiber optic interface, including a physical layer controller at each end of two full-duplex fiber optic links, comprises the steps of accepting a data packet from a first processor for transmission to a second processor. The data packet is reformatted and synchronized from a system clock to a local clock. The even bytes of the data packet are sent from the first physical layer controller on one end of the interface to the first physical layer controller on the other end of the interface. The odd bytes of the data packet are sent from the second physical layer controller on one end of the interface to the second physical layer controller on the other end of the interface. The even and odd bytes are sent in parallel. The even and odd bytes are received by the physical layer controllers, reformatted, and synchronized from the local clock to the system clock. The data packet is then presented to the destination.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7 is a table of the symbols transferred from the Light Pipe Frame Control to the PLAYER+ components.

FIG. 8 is a table of the symbols transferred from the PLAYER+ components to the Light Pipe Frame Control.

FIG. 16 is a diagram of the format of the Frame Control field.

DESCRIPTION OF THE PREFERRED EMBODIMENT

I. System Architecture Overview

Figure 1:
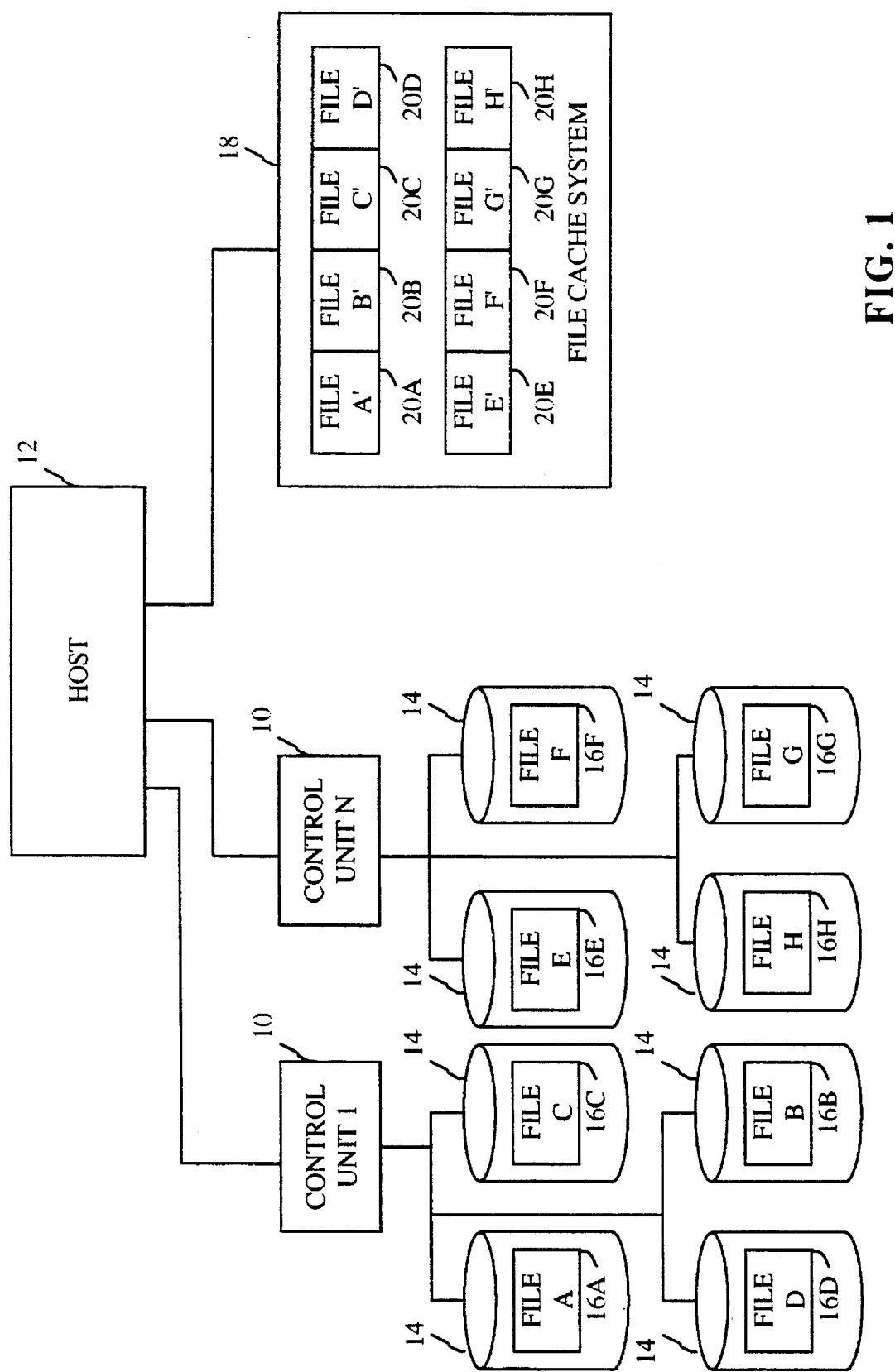
FIG. 1 illustrates the environment in which this invention operates.

FIG. 1 illustrates the environment in which this invention operates. In a typical large computer system, a plurality of Control Units 10 are coupled to a Host computer 12 for providing access to multiple mass storage Disks 14. In the preferred embodiment, the Host 12 is a 2200 Series computer system available from the assignee of this invention. Application and system software executing on Host 12 read data from and write data to Files 16A–H, which are stored on Disks 14. While Files 16A–H are depicted as blocks it should be understood that the data is not necessarily stored contiguously in Disks 14.

The File Cache System 18, of which the subject invention is a part, provides an intermediate storage capability for the Host 12 with a greatly improved file access time and resiliency against data loss which is comparable to Disks 14. All or parts of active Files 16 may be stored in the File Cache System 18, depending on the storage capacity of the File Cache System 18, and the size and number of Files 16 selected by the system software on the Host 12 to be cached.

The portion of Files 16 that are stored in the File Cache System 18 are shown as blocks 20A–H. The cached portion of Files 16 are labelled File A', File B', . . . , File H' for discussion purposes. File A' 20A is the portion of File A that is stored in File Cache System 18; File B' 20B is the portion of File B that is stored in File Cache System 18; and so on. The existence of the File Cache System at this level of the storage hierarchy allows references to cached files to be immediately directed to the File Cache System for processing, in contrast to references to non-cached files where an Input/Output (I/O) channel program must be constructed on the Host 12 to access the proper Disk 14 via a Control Unit 10. The implementation of the File Cache System 18 reduces the path length that a request must travel in order to update a File 16. This reduced path length, coupled with the powerful processing capabilities of the File Cache System 18, results in shortened File access times.

Figure 2:
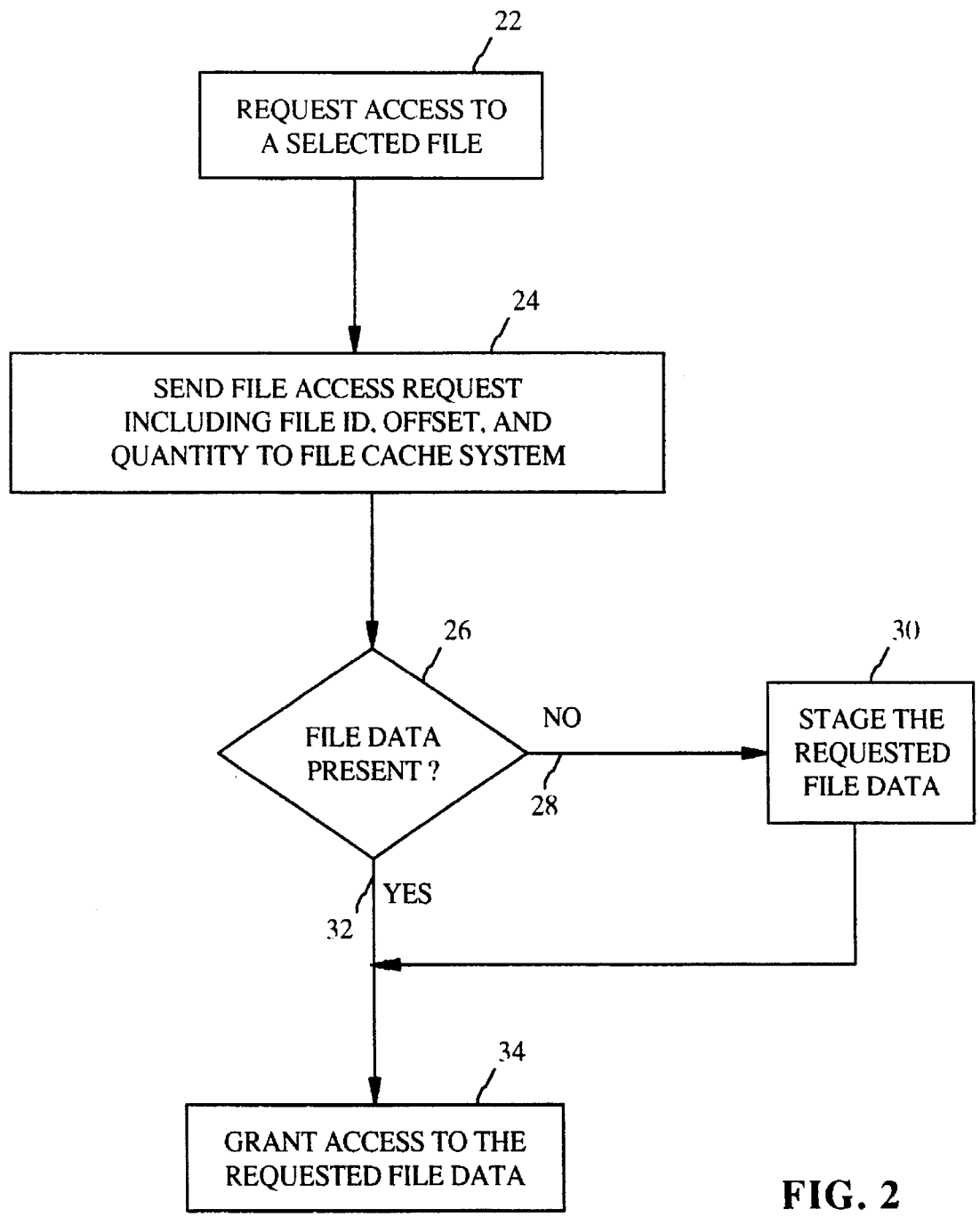
FIG. 2 is a flow chart showing how file accesses are accomplished within the File Cache System.

FIG. 2 is a flow chart showing how file accesses are accomplished within the File Cache System. The processing begins at Step 22 where application software executing on Host 12 requests access to a selected File. The access request may a request to read data from or write data to the selected File.

A File access request is sent to the File Cache System 18 at Step 24. The File access request contains a File identifier (ID), which specifies the File on which the read or write operation is to be performed; an offset from the beginning of the File, which specifies precisely where in the File the operation is to begin; and the quantity of data which is to be read from or written to the File. At Test 26, the File Cache System 18 uses the File ID, offset, and quantity to determine if the requested File data is already present in the File Cache System. If the requested File data is not present, then Path 28 is followed to Step 30, and the File Cache System 18 "stages" (reads) the requested File data from the appropriate File 16 on Disk 14 to the cached File 20 in the File Cache System. If the requested File data is present, Path 32 is followed to Step 34 where the File Cache System grants access to the requested File data.

Figure 3:
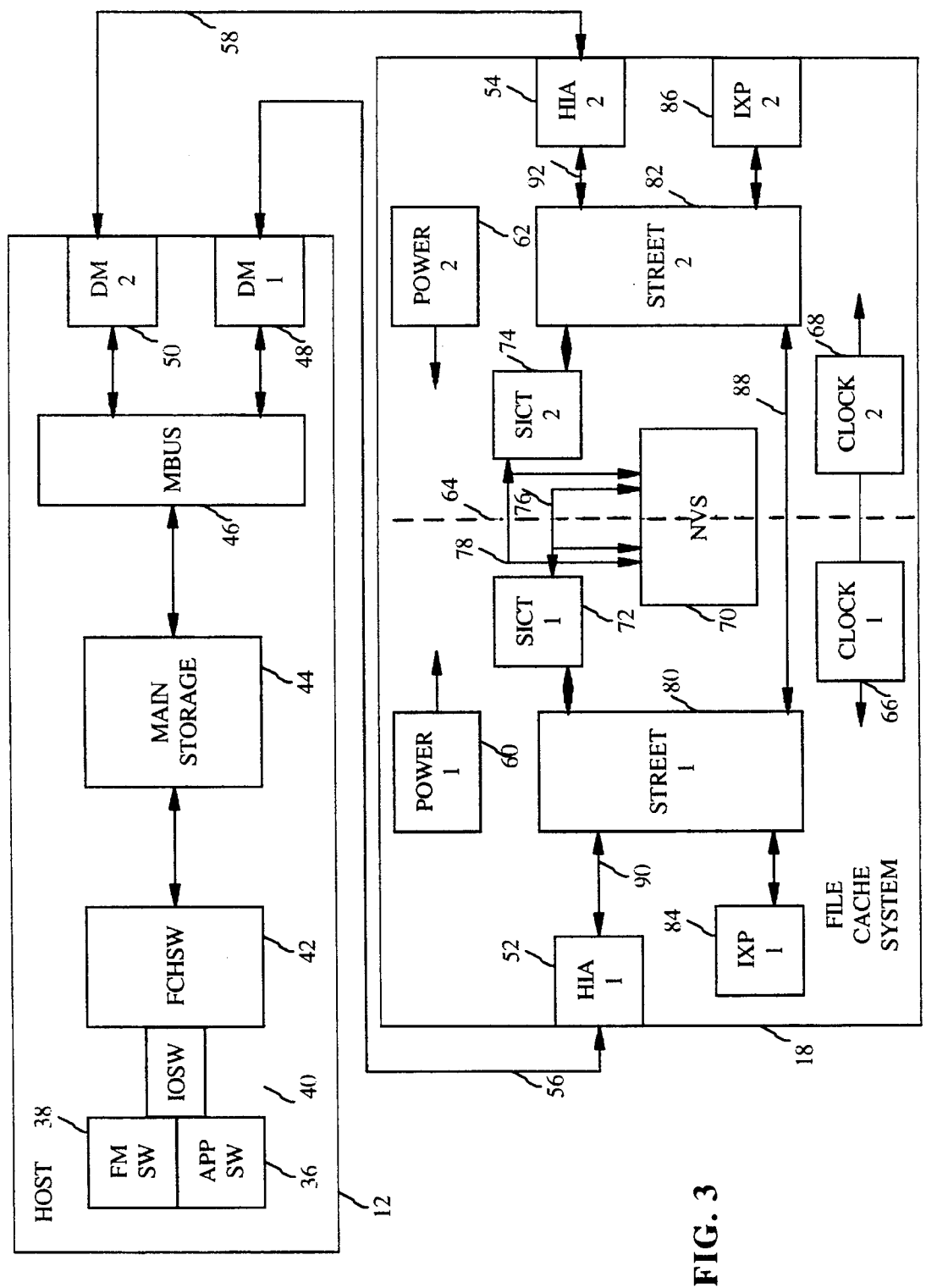
FIG. 3 is a functional block diagram of the hardware and software components of the File Cache System.

FIG. 3 is a functional block diagram of the hardware and software components of the File Cache System. The system is comprised of hardware and software elements in both the Host 12 and File Cache System 18. The software on Host 12 is shown by blocks 36, 38, 40, and 42. The blocks are joined to signify the interrelationships and interfaces between the software elements.

Application Software (APP SW) 36 provides data processing functionality to Host system 12 end users and includes applications such as financial transaction processing and airline reservations systems. Data bases maintained by Application Software 36 may be stored in one or more of the exemplary Files 16 as shown in FIG. 1. File Management Software (FM SW) 38, Input/Output Software (IO SW) 40, and File Cache Handler Software (FCH SW) 42 are all components of the Host's operating system software (not shown). In general, File Management Software 38 provides management of file control structures, and in particular handles the creating, deleting, opening, and closing of files.

Input/Output Software 40 provides the software interface to each of the various I/O devices coupled to the Host 12. The I/O devices (not shown) may include network communication processors, magnetic disks, printers, magnetic tapes, and optical disks. Input/Output Software 40 builds channel programs, provides the channel programs to the appropriate I/O processor function within the Host 12, and returns control to the requesting software at the appropriate time.

File Cache Handler Software 42 coordinates the read and write accesses to cached files. In general, File Cache Handler Software 42 provides the operating system level interface to the File Cache System 18, "stages" (reads) File data from Disks 14 to the File Cache System 18, and "destages" (writes) File data from the File Cache System 18 to Disks 14. The File Cache Handler Software 42 provides File data and File access requests to the hardware interface to the File Cache System 18 via Main Storage 44. Main Storage 44 is coupled to an I/O bus called the M-Bus 46.

The Data Mover (DM) components 48, 50 provide the hardware interface to the File Cache System 18. While two DMs 48, 50 are shown, the system does not require two DMs for normal operation. A configuration with two DMs provides fault tolerant operation; that is, if one DM fails, the other DM is available to process File access requests. In alternate embodiments, there could be up to 32 DMs. Each DM 48, 50 is coupled to the M-Bus 46 of Host 12. File Cache Handler Software 42 distributes File access requests among each of the DMs 48, 50 coupled to M-Bus 46. If one DM fails, File access requests queued to that DM can be redistributed to the other DM.

The Data Movers (DMs) 48, 50 perform the same general functions as an I/O processor, that is, they read data from and write data to a peripheral device. The DMs can also read from and write to Main Storage 44 via the M-Bus 46. The DMs 48, 50 coordinate the processing of File access requests between File Cache Handler Software 42 and the File Cache System 18 and transfer File data between Main Storage 44 and the File Cache System 18. This transfer of File data must be performed at the fastest possible rate. Each of the DMs is coupled to a Host Interface Adapter (HIA) 52, 54 component within the File Cache System 18. DM 1 48 is coupled to HIA 1 52 by a Fiber Optic Interface shown as Line 56, and DM 2 50 is coupled to HIA 2 54 by a second Fiber Optic Interface shown as Line 58. This DM/HIA communications path, implemented as a Fiber Optic Interface, is the invention disclosed in the present application.

The File Cache System 18 is configured with redundant power, redundant clocking, redundant storage, redundant storage access paths, and redundant processors for processing File access requests, all of which cooperate to provide a fault tolerant architecture for storing File data. The File Cache System 18 is powered by dual Power Supplies, Power 1 60 and Power 2 62. The portion of the File Cache System 18 to the left of dashed line 64 is powered by Power 1 60 and is referred to as Power Domain 1, and the portion of the File Cache System to the right of dashed line 64 is powered by Power 2 62 and is referred to as Power Domain 2. Each of the Power Supplies 1 and 2 has a dedicated battery and generator backup to protect against loss of the input power source.

Clock 1 66 and Clock 2 68 are separately powered to provide timing signals to all of the components of the File Cache System 18. Clock 1 66 provides timing to the components within Power Domain 1 and Clock 2 68 provides timing to the components within Power Domain 2. Redundant oscillators within each Clock provide protection against the failure of one of them, and Clocks 1 and 2 are synchronized for consistent timing across Power Domains 1 and 2.

The Non-Volatile Storage (NVS) component 70 includes multiple dynamic random access memory (DRAM) storage modules. Half of the storage modules are within Power Domain 1 and the other half are within Power Domain 2. The data stored in the storage modules in Power Domain 2 is identical to the data stored in storage modules in Power Domain 1. Thus, NVS 70 provides for the redundant storage of File data 20 and the control structures used by the File Cache System 18. The redundant storage organization supports both single and multiple bit error detection and correction.

The portion of Non-Volatile Storage (NVS) 70 within each of the Power Domains 1 and 2 is coupled to two Storage Interface Controllers (SICTs) 72, 74. While only two SICTs are shown in FIG. 3, each half of NVS 70 is capable of being addressed by up to four SICTs. Line 76 represents the coupling between SICT 1 72 and the portion of NVS 70 within each of Power Domains 1 and 2. Similarly, Line 78 represents the coupling between SICT 2 74 and NVS 70.

Read and write requests for NVS 70 are sent to the SICTs 72, 74 via local network Street 1 80 and Street 2 82. The Street provides data transfer and interprocessor communication facilities between the major components within the File Cache System 18. The Streets provide multiple requesters (HIA 1 52, HIA 2 54, Index Processor (IXP) 1 84, or IXP 2 86) with high-speed, high-bandwidth access to NVS 70, as well as multiple paths for redundant access. Crossover 88 provides a path whereby NVS 70 requests may be sent from Street 1 80 to Street 2 82, or visa versa, if either SICT 72 or SICT 74 is unavailable. For example, if SICT 1 72 fails, NVS requests sent from requesters (HIAs and IXPs) are sent to Street 2 82 via Crossover 88, whereby NVS 70 access is provided by SICY 2 74. Each SICT is capable of updating both halves of the NVS 70.

The Host Interface Adaptors (HIAs) 52, 54 perform functions in the File Cache System 18 which are similar to the functions performed by the Data Movers (DMs) 48, 50 on the Host 12. In particular, the HIAs receive File access requests sent from the DMs, write File data sent from the Host 12 to NVS 70, and read File data from NVS and send it to the Host. The HIAs also contain the logic for sending and receiving data over the Fiber Optic Interfaces 56, 58. HIA 1 52 interfaces with Street 1 80 over Line 90, and HIA 2 54 interfaces with Street 2 82 over Line 92.

Index Processor (IXP) 1 84 and IXP 2 86 manage allocation of the storage space available in NVS 70, service File access requests sent from Host 12, and generally provide for overall File Cache System 18 management.

Figure 4:
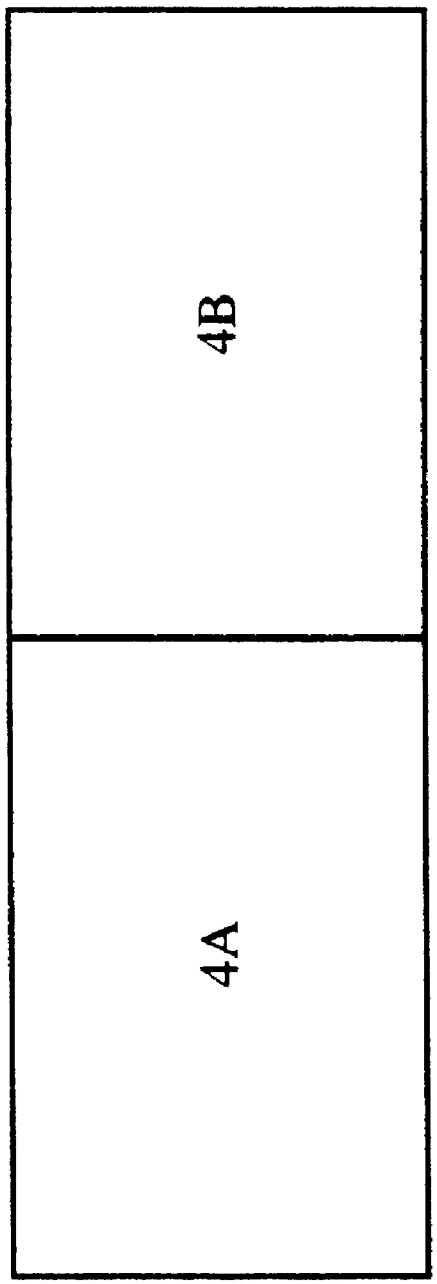
FIG. 4, comprising
Figure 4A:
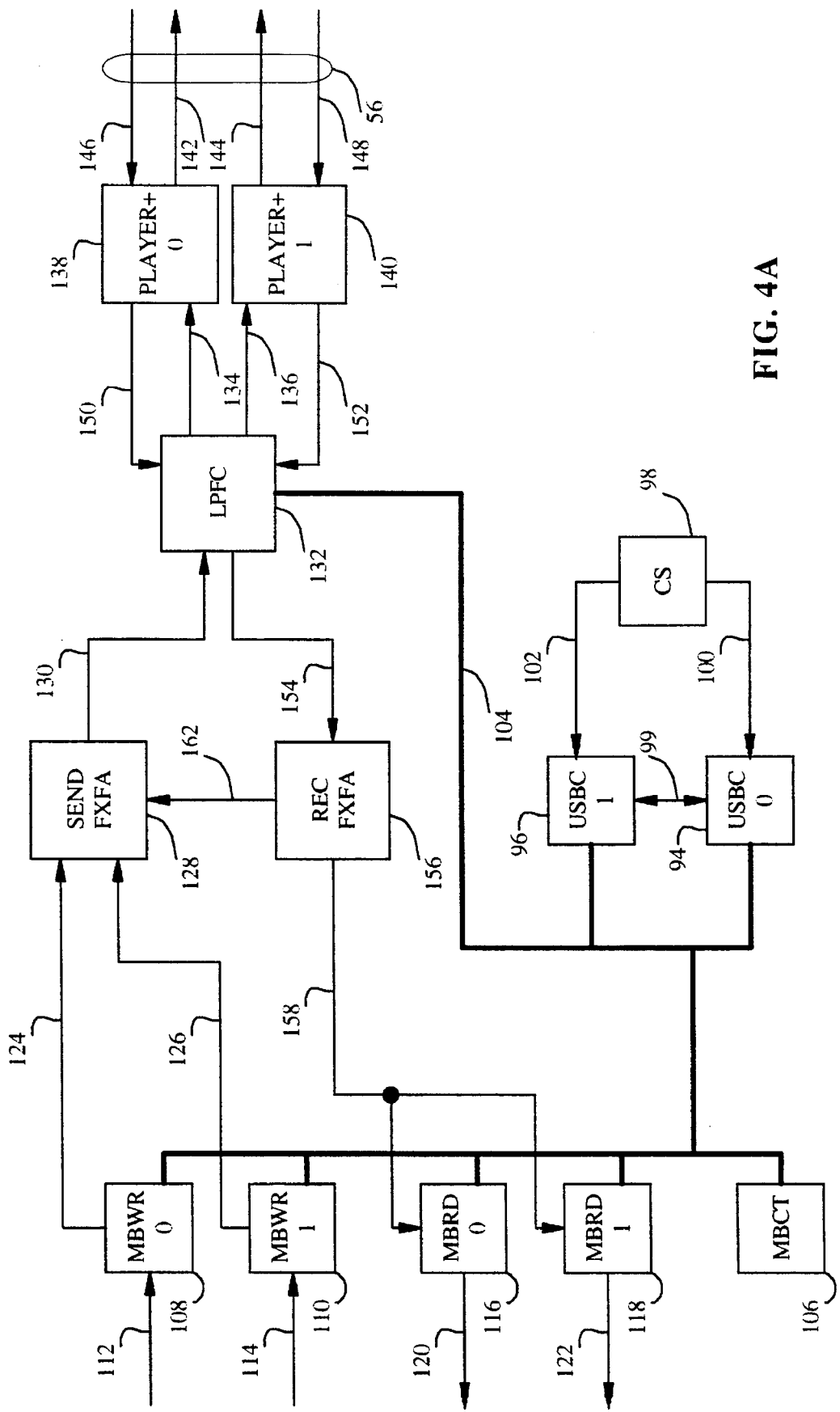
FIG. 4(A) and FIG. 4(B), is a detailed block diagram showing the components of a Data Mover and a Host Interface Adaptor.
Figure 4B:
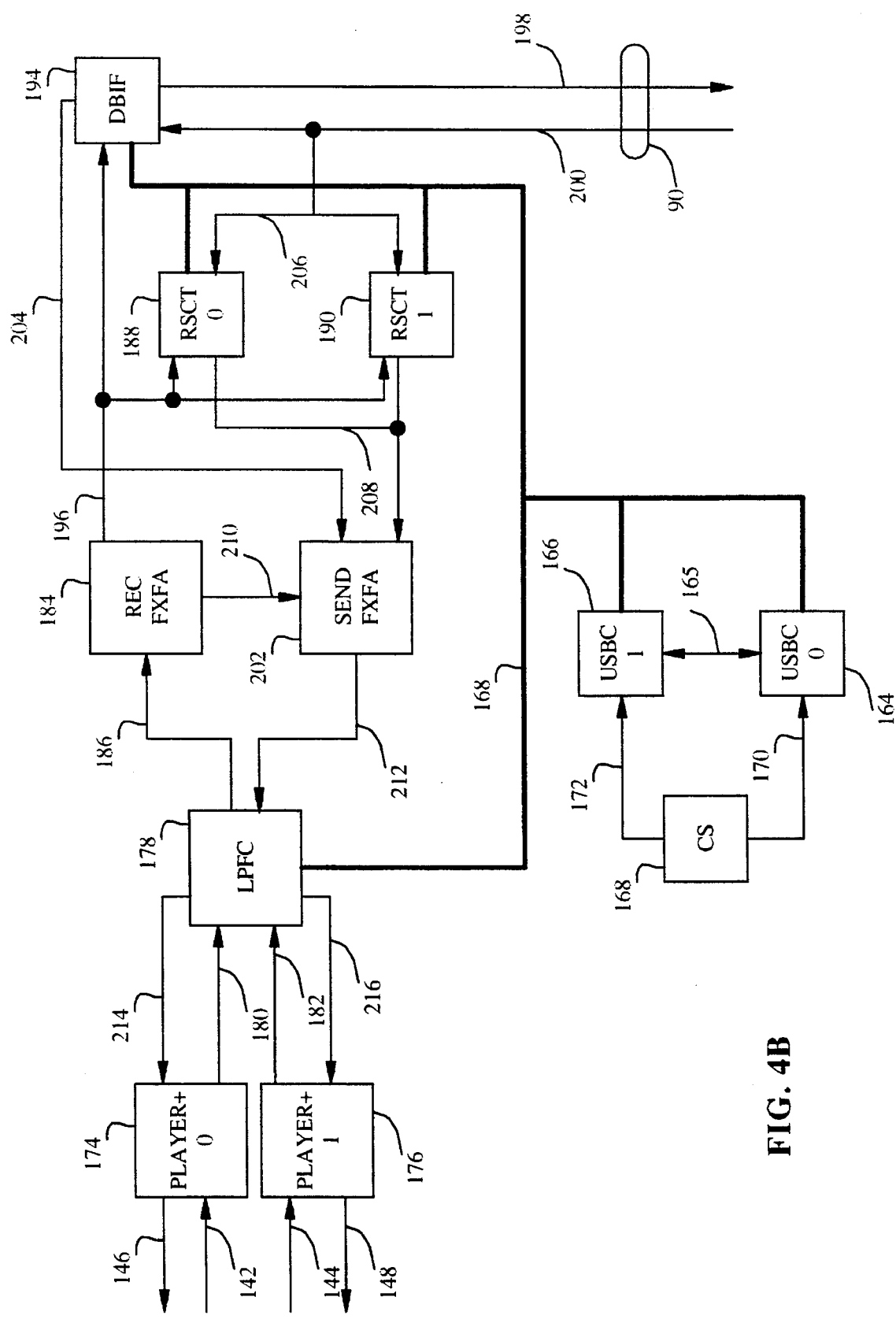

FIG. 4, comprising FIG. 4(A) and FIG. 4(B), is a detailed block diagram showing the components of a Data Mover and a Host Interface Adaptor. The DM and HIA exist as a pair because they are opposing ends of a communications path. The DM component 48 and the HIA component 52 are each instances of the Microsequencer Bus Controller (USBC) System. The DM 48 interfaces with the M-Bus 46 on the Host 12. The DM also communicates with the HIA 52 over Fiber Optic Interface 56. Thus, the DM and the HIA may be physically located some distance apart from each other, the actual distance being dependent on the length of the Fiber Optic Interface 56. The HIA 52 interfaces over Lines 90 to the Street 80.

FIG. 4(A) shows the components of a Data Mover. The architecture of the DM 48 as an instance of a Microsequencer Bus Controller System shows that there are two Microsequencer Bus Controllers (uSBCs) 94, 96 connected to a Control Store (CS) 98 via Lines 100, 102. The uSBC 0 94 and uSBC 1 96 are Reduced Instruction Set (RISC) microprocessors that control various special purpose gate arrays called Stations connected to the Micro Bus 104. The uSBCs execute the same instruction stream in parallel with each other. The Micro Bus 104 is a bidirectional communications bus. The uSBCs support an instruction set with seven basic instructions in it. The instructions are of fixed length and specify either one or two operands only. The internal circuitry of the uSBCs is "hard-wired", i.e., it is not microprogrammed. The results from operations performed by uSBC 1 96 are transferred to uSBC 0 94 for error detection purposes over Line 99. The Control Store 98, consisting of seven static random access memories (SRAMs), is used to store the instruction stream that the uSBCs execute in parallel.

The M-Bus Controller (MBCT) Station 106 handles M-Bus 46 arbitration and controls data transfers between other Data Mover (DM) Stations and the M-Bus 46. There are two DM Stations to transfer data to the M-Bus 46 and two DM Stations to transfer data from the M-Bus. The M-Bus Write (MBWR) 0 108 and MBWR 1 110 Stations receive data from the M-Bus 46 via Lines 112 and 114, respectively. The M-Bus Read (MBRD) 0 116 and MBRD 1 118 Stations send data to the M-Bus 46 via Lines 120 and 122 respectively. The MBCT 106 controls the access of these DM Stations to the M-Bus 46 over an interface (not shown) separate from the Micro Bus 104. Data is passed from MBWR 0 108 and MBWR 1 110 via Lines 124 and 126 to the Send Frame Transfer Facility (SEND FXFA) gate array 128. The SEND FXFA 128 packages the data into transmission packets called frames, which are passed over Line 130 to the Light Pipe Frame Control (LPFC) gate array 132. The LPFC 132 sends each frame over Lines 134 and 136 to dual PLAYER+ Physical Layer Controllers, consisting of PLAYER+ 0 138 and PLAYER+ 1 140, which are commercially available from National Semiconductor Corporation. The PLAYER+ 0 138 and PLAYER+ 1 140 transmit flames over Fiber Optic Links 142 and 144 to the HIA 52.

When the Host Interface Adaptor (HIA) 52 sends frames to the Data Mover (DM) 48, PLAYER+ 0 138 and PLAYER+ 1 140 receive each frame over Fiber Optic Links 146 and 148. The PLAYER+ 0 138 component forwards its portion of the frame over Line 150 to the LPFC 132. Similarly, the PLAYER+ 1 140 component forwards its portion of the frame over Line 152 to the LPFC. The LPFC sends each frame via Line 154 to the Receive Frame Transfer Facility (REC FXFA) gate array 156, which unpacks the data and stores it in MBRD 0 116 and MBRD 1 118 via Line 158. The REC FXFA 156 sends an acknowledgment for the data transfer to the SEND FXFA 128 over Line 162.

FIG. 4(B) shows the components of a Host Interface Adaptor. The architecture of the HIA 52 as an instance of a Microsequencer Bus Controller System shows that there are two uSBCs 164, 166 connected to a Control Store (CS) 168 via Lines 170, 172, respectively. The Microsequencer Bus Controllers (uSBCs) 164, 166 access the HIA Stations via the Micro Bus 168. The PLAYER+ 0 174 and PLAYER+ 1 176 components receive frames over Fiber Optic Links 142 and 144, respectively. PLAYER+ 0 174 forwards its portion of each frame to Light Pipe Frame Control (LPFC) 178 over Line 180. Similarly, PLAYER+ 1 176 forwards its portion of each frame to LPFC 178 over Line 182. The LPFC 178 transfers each frame to the Receive Frame Transfer Facility (REC FXFA) 183 over Line 184. The REC FXFA 183 unpacks the frames and stores control information in the Request Status Control Table 0 (RSCT) 185 and the RSCT 1 186 Stations via Line 188. The RSCT 0 and RSCT 1 Stations monitor the data that has been received from the DM 48. The data which was contained in the frame received by the REC FXFA 183 is sent to the Database Interface (DBIF) Station 187 over Line 188. The DBIF 194 forwards the data over Line 189 to the Street 1 80.

Data received by the DBIF 187 over Line 190 from the Street 1 80 is sent to the Send Frame Transfer Facility (SEND FXFA) 191 via Line 192. Control information received over Line 200 from the Street 1 80 is sent to RSCT 0 185 and RSCT 1 186 over Line 193. The SEND FXFA 191 takes this data and control information from RSCT 0 185 and RSCT 1 186 via Line 194 and formats a frame for transmission by the LPFC 178. Acknowledgements from REC FXFA 183 are received by SEND FXFA 191 over Line 195. The frame is forwarded over line 196 to the LPFC 178. The LPFC 178 creates two portions of the frame it received and sends one portion of the frame to PLAYER+ 0 174 over Line 197 and the other portion of the frame to PLAYER+ 1 176 over Line 198. The frame is then transmitted over the Fiber Optic Links 146 and 148 to the DM 48. The Microsequencer Bus Controllers (uSBCs) 94, 96, 164, 166 and the Micro Busses 104, 168 manipulate data in the system according to a hardware mode pin setting. When the mode pin is set, the Microsequencer Bus Controller System instance is a Data Mover (DM) 48 operating on 36-bit data words in communicating with its Stations. When the mode pin is clear, the Microsequencer Bus Controller System is a Host Interface Adaptor (HIA) 52 operating on 32-bit data words in communicating with its Stations.

II. Fiber Optic Interface

The Fiber Optic Interface 56 is a dedicated I/O interface and related protocol for data transmissions from point to point over a fiber optic link. It provides an asynchronous, full duplex data path based on the ANSI X3T9.5 (FDDI) Physical and Data Link Layer standards of the Open Systems Interconnection model developed by the International Standards Organization.

The Fiber Optic Interface 56 is compatible with the Physical Media Dependant (PMD) and Physical Layer (Layer 1), as defined by the FDDI standards, for transmission and reception of data across Fiber Optic Links 142, 144, 146, 148. Multiple data streams are transmitted in parallel over a pair of cascaded PLAYER+ devices. Two fiber optic channels are used to double the throughput and bandwidth. Each fiber can handle up to 12.5 million bytes (MB) per second of data. The even bytes of a data block are transferred on one fiber. The odd bytes of the data block are concurrently transferred on the other fiber. Thus, by using a cascaded mode of operation, the throughput is expanded to 25 MB per second (200 million bits per second). The two fibers must be operated in lock step with each other and both must be operational for any data to be transferred. The fibers are 62.5 micron multi-mode graded index fiber optic cables with a wavelength of 1,300 nanometers and a frequency of 125 million Hertz (MHz). The length of the fibers must not exceed four kilometers. The total skew between the two data paths must be less than 80 nanoseconds. Because data throughput is a performance limiting factor in the File Cache System 18, the interface between the Host system 12 and the File Cache System is an ideal candidate for a high speed point-to-point Fiber Optic Interface.

A. Functional Overview

Figure 5:
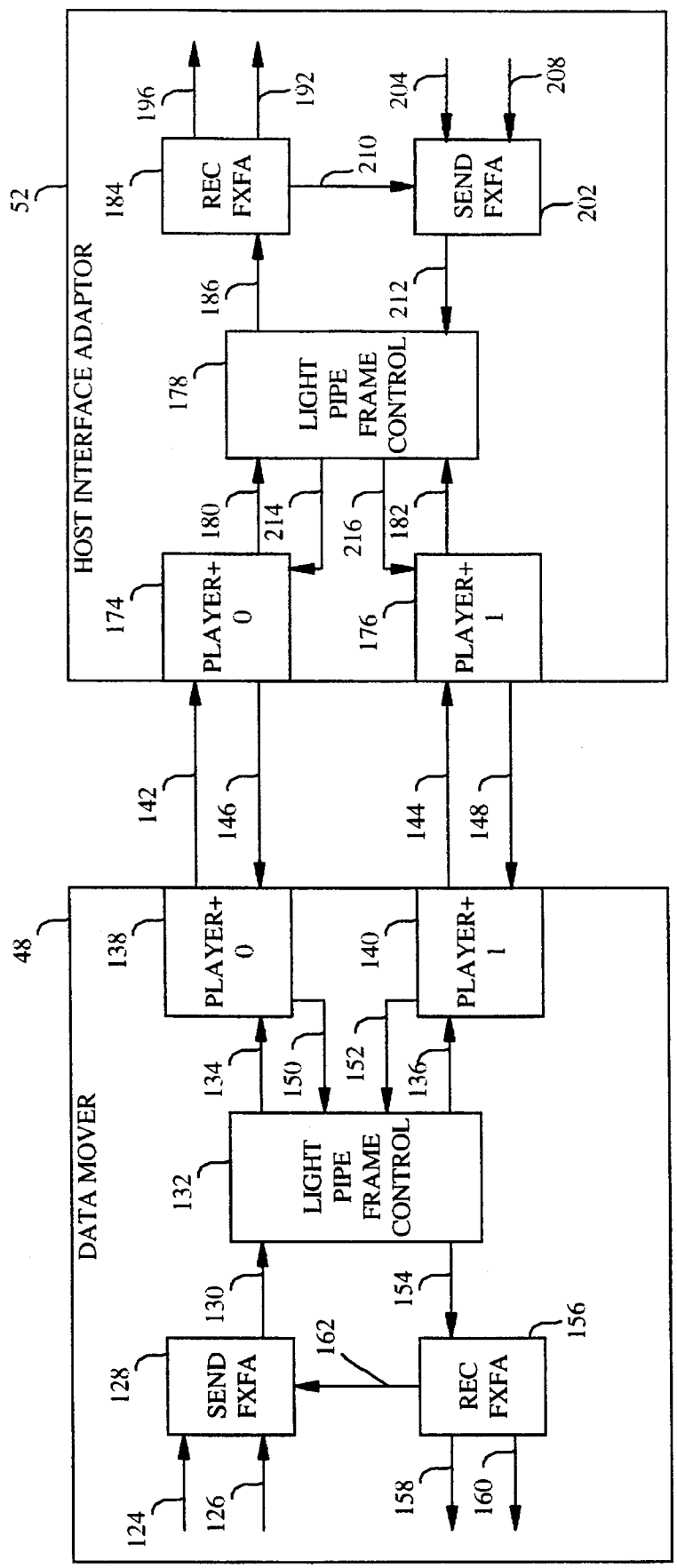
FIG. 5 is a block diagram of the components of the Fiber Optic Interface.

FIG. 5 is a block diagram of the components of the Fiber Optic Interface. Recall that in the Host system 12, the Data Mover (DM) 48 is connected to a M-BUS 46. When the operating system on the Host system needs to send dam to the File Cache System 18, a command packet is sent through the M-Bus Write VLSIs 108, 110 via Lines 124, 126 to the Send Frame Transfer Facility (SEND FXFA) 128 component of the DM, where it is buffered. The FXFA is responsible for data segmentation, flow control, and Fiber Optic Interface retries. The FXFA is a 448 Complementary Metal-Oxide Semiconductor (CMOS) VLSI gate array. The Send FXFA 128 has eight buffers in which to store data. The Send FXFA uses these eight buffers in a circular fashion. The Send FXFA converts the command packet from 36-bit words to 32-bit words. It performs this conversion because data stored on the Host computer system 12 is in a 36-bits per word format, but data handled by the PLAYER+ components and the rest of the components of the File Cache System must be in 32-bits per word format. The Send FXFA 128 inserts control information to the front of the command packet and transfers the data over Line 130 to the DM Light Pipe Frame Control (LPFC) component 132. This data consists of 32-bit words plus two parity bits. The LPFC 132 is a 448 CMOS VLSI gate array that connects to the FXFAs on one side and to the PLAYER+ components on the other side. It is responsible for clock synchronization, speed matching, packet formation, and error detection.

Although this is a non-FDDI application because it is a point-to-point implementation rather than a token ring, the rules for FDDI framing must be followed in order to utilize the PLAYER+ components. A frame is the basic unit of information that is transmitted across the Fiber Optic Interface 56. It consists of multiple symbol pairs of control symbols and data symbols.

The Data Mover (DM) Light Pipe Frame Control (LPFC) 132 takes the command packet, synchronizes this data to a local clock and splits the 32-bit words plus two parity bits into two 16-bit words plus two parity bits each word. It then splits the 16-bit words plus two parity bits into two byte streams. The byte streams consist of 9-bit blocks with one parity bit each block. The DM LPFC 132 creates encoded frames with added error checking information from each stream. The even bytes of data are put into one frame and the odd bytes of data are put into a second frame. The DM LPFC 132 then passes the even byte data frame to DM PLAYER+ 0 138 over Line 134 and the odd byte data frame to DM PLAYER+ 1140 over Line 136. The data is serialized in the two PLAYER+ components and sent one bit at a time to their respective optical transmitters (not shown). The frames on the two fibers are transmitted in parallel.

The functionality of DM PLAYER+ 0 138 and DM PLAYER+ 1 140 is fully described in The Fiber Distributed Data Interface (FDDI) Databook available from National Semiconductor Corporation. The DP83251/55 PLAYER+ Device is a FDDI Physical Layer Controller that contains Non-Return to Zero (NRZ)/Non-Return to Zero Invert on Ones (NRZI) and 4B/5B encoders and decoders, serializer/desefializer, framing logic, elasticity buffer, line state detector, repeat filter, smoother, and configuration switch. The PLAYER+ device also contains clocking capabilities formerly resident on separate devices such as the Clock Recovery Device (CRD) and Clock Distribution Device (CDD), also commercially available from the National Semiconductor Corporation. The PLAYER+ device implements the Physical Layer protocol as defined by the American National Standard "FDDI Token Ring Physical Layer Protocol (PHY)" document, ANSI X3.148-1988. The PLAYER+ devices convert a 12.5 MB/s input stream into a 125 Mbaud 4B/SB encoded bit stream as specified in the FDDI Physical Layer standard. Additional components relating to the PLAYER+ devices are the Transceivers (not shown), which provide electrical to light conversions.

The DM PLAYER+ 0 138 and DM PLAYER+ 1 140 transmit the frames in parallel across two Fiber Optic Links 142, 144 to HIA PLAYER+ 0 174 and HIA PLAYER+ 1 176. The use of two Links is called cascade mode. In cascade mode, multiple PLAYER+ devices are connected together to provide data transfer at multiples of the FDDI data rate. While the DM LPFC 132 is transmitting the flames, it computes a Frame Check Sequence (FCS) value for each frame, until all data in each flame has been transferred to the DM PLAYER+ 0 138 and DM PLAYER+ 1 140. At the end of the data, the DM LPFC transmits the FCS field and an Ending Delimiter (ED) field to DM PLAYER+ 0 138 and DM PLAYER+ 1 140.

The receiving Host Interface Adaptor (HIA) PLAYER+ 0 174 and HIA PLAYER+ 1 176 components receive the flames serially from the Fiber Optic Links 42, 144 through optical receivers (not shown). The data is then resynchronized and deserialized. Each PLAYER+ device then sends a stream of bytes obtained from their respective frames to the Host Interface Adaptor (HIA) Light Pipe Frame Control (LPFC) 178 over Lines 180 and 182, respectively. The HIA LPFC 178 verifies the packet formats to ensure that valid data symbols are being received. The HIA LPFC 178 also performs a FCS error check on the data contained in each frame as each frame is received. The two byte streams are merged to form 16-bit words. The 16-bit words are then combined to form 32-bit words. The HIA LPFC 178 then resynchronizes the data and sends this reconstituted data to the HIA REC FXFA 184 over Line 186 where the data is buffered. The HIA REC FXFA 184 transmits the data over Lines 192 and 196 through other VLSIs in the HIA 52 to the intended recipient via the Street 1 80 or Street 2 82.

The Host Interface Adaptor (HIA) Receive Frame Transfer Facility (REC FXFA) 184 sends an acknowledgement (ACK) or negative acknowledgment (NAK) to the HIA SEND FXFA 202 over Line 210, depending on the status of the data transfer. The HIA SEND FXFA 202 buffers the ACK or NAK packet and passes the data to the HIA LPFC 178 over Line 212. The HIA LPFC 178 converts the ACK or NAK into two frames by splitting the data into even and odd portions and sends the frames to the HIA PLAYER+ 0 174 and HIA PLAYER+ 1 176 components over Lines 214 and 216, respectively, for subsequent transmission to the DM PLAYER+ 0 138 and DM PLAYER+ I 140 components. The DM PLAYER+ 0 138 and DM PLAYER+ 1 140 components receive the frames over Fiber Optic Links 146 and 148, respectively, and pass them to the DM LPFC 132 over Lines 150 and 152, respectively. The DM LPFC unpacks the ACK or NAK from the frames. If the ACK is unexpected or does not match a previous transmission, or the message received is really a NAK, then the DM SEND FXFA 128 is required to resend the command packet according to the steps described above. The DM LPFC 132 sends the NAK over Line 154 to the DM REC FXFA 156, which forwards a request to resend the data to the DM SEND FXFA 128 over Line 162. Otherwise, the data transfer process is considered to be complete.

Similarly, if data or status is to be sent from the HIA 52 to the DM 48, data is received by the HIA SEND FXFA 202 from the Street 1 80 or Street 2 82 via other VLSIs in the HIA over Lines 204, 208. The HIA SEND FXFA 202 passes the data to the HIA LPFC 178 over Line 212, where the data is then formatted into two flames for transmission by HIA PLAYER+ 0 174 and HIA PLAYER+ 1 176 components. The flames are received by the DM PLAYER+ 0 138 and DM PLAYER+ 1 140 components, which pass the frames to the DM LPFC 132. The DM LPFC unpacks the flames and sends the data to the DM REC FXFA 156. The data is then transferred across the M-Bus 46 (not shown) back to the operating system on the Host system 12 (not shown). An ACK or NAK is then transmitted back to the HIA according to the ACK or NAK sequence described above.

B. Clocks, Clock Recovery, and Resynchronization

Figure 6:
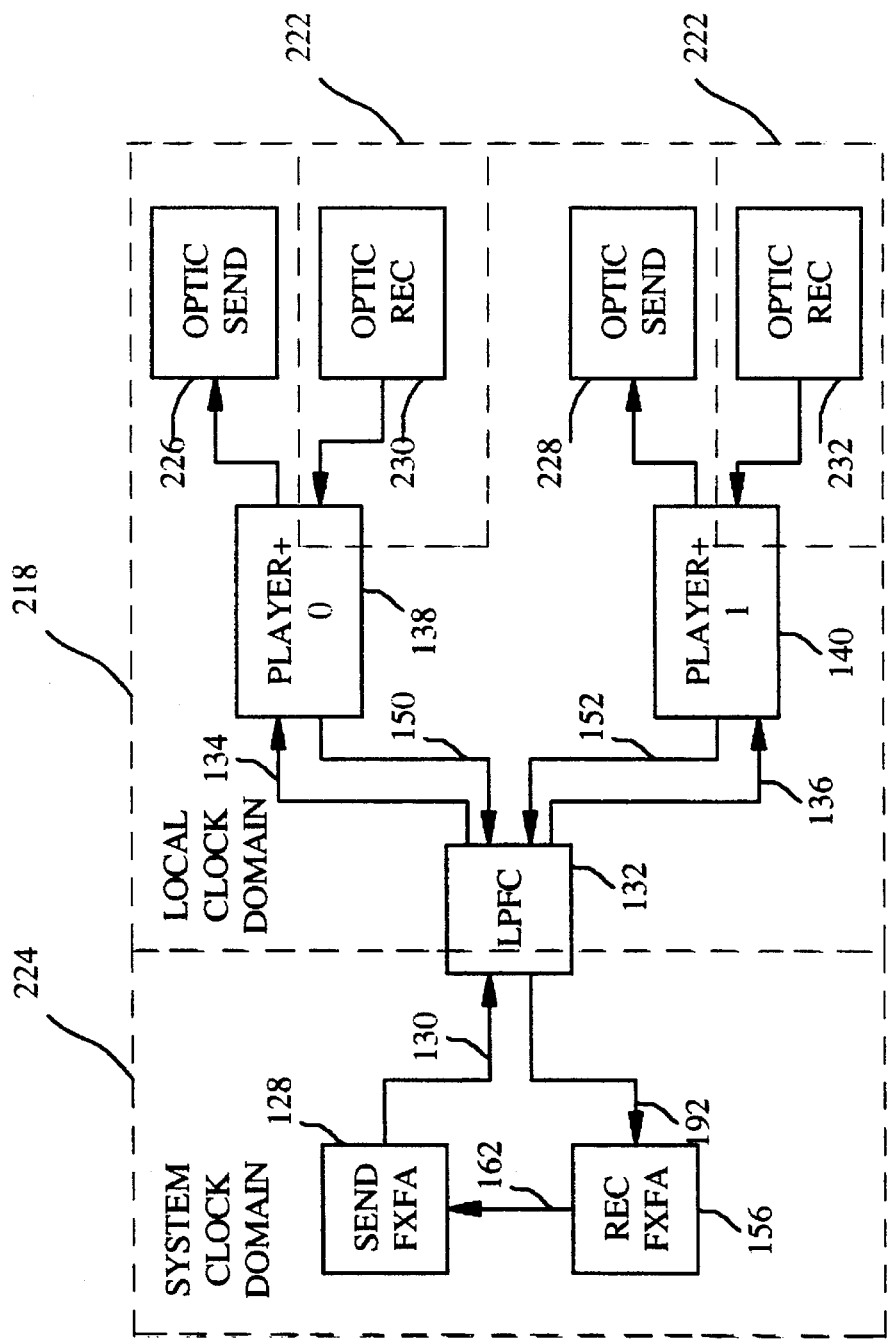
FIG. 6 is a block diagram of the clock domains for one end of the Fiber Optic Interface.

FIG. 6 is a block diagram of the clock domains for one end of the Fiber Optic Interface. Each end of the Fiber Optic Interface is clocked by a local oscillator running at 50 MHz plus or minus 50 parts per million (PPM). This Local Clock Domain 218 includes part of the Light Pipe Frame Control (LPFC) 132 and most of the PLAYER +components 138, 140. The 50 MHz clock is divided by four down to 12.5 MHz in LPFC 132 before it is passed to the PLAYER+ components. The remainder of the PLAYER+ components are contained in a Recovered Clock Domain 222, which is clocked by a recovered clock synchronized with the incoming data. The remainder of LPFC 132 is contained in the System Clock Domain 224. The System Clock Domain 224 is clocked by system clocks that clock the rest of the File Cache System 18. The system clock frequency must be between 30 MHz and 50 MHz. The DM's 48 system clock operates at 44 MHz and the HIA's 52 system clock operates at 40 MHz.

The Fiber Optic Interface 56 uses NRZI encoding. NRZI is a common serial data communication encoding scheme that allows both clock and data information to be transmitted over a single serial path. A binary one is represented by a transition from either light on to light off or light off to light on. A zero is represented by the lack of a transition, i.e., the light stays on or stays off during the bit time.

At the receiving end of the Fiber Optic Interface, a recovered clock is developed from the incoming NRZI encoded data using a phase locked loop oscillator. Every time an edge occurs in the incoming NRZI data, the phase locked loop corrects the phase of the oscillator. Between transitions the oscillator begins to drift. To prevent the oscillator from drifting too far, a restriction of no more than three consecutive zeros is placed on the serial interface.

There are two components of the Fiber Optic Interface that perform resynchronization of data. The PLAYER+ components 138, 140 resynchronize incoming data being clocked by the recovered clock to the local oscillator. Since the recovered clock is synchronized to the local oscillator on the other end of the Interface, its frequency must be within plus or minus 50 PPM of 12.5 MHz. The local oscillator on the receiving end must also be within this range. Hence, the two clocks can differ by as must as 100 PPM, making resynchronization necessary. The PLAYER+ components have internal serial asynchronous First-In-First-Out (FIFO) buffers deep enough to resynchronize data differing in frequency by 100 PPM as long as the packets are no longer than 4500 bytes. This buffer recenters itself between packets to prevent underflow or overflow.

The other component involved in resynchronization is the Light Pipe Frame Control (LPFC) 132. It contains an eight deep, 32-bit word asynchronous FIFO buffer in both its transmit and receive paths. These buffers resynchronize data between the Local Clock Domain 218 and the System Clock Domain 224.

C. Data Link Layer Protocol

The I/O protocol at the Data Link Layer of the Fiber Optic Interface defines the methods of communication over the interface. It includes two types of messages: line states and frames. Line state information is used only for interface control functions such as initialization, termination, and clearing of the interface. Information packets called frames are used to contain user-supplied information to be transferred across the Fiber Optic Links. Line state information and frames are both made up of data units called symbols.

1. Symbols

The interface between the Light Pipe Frame Control (LPFC) 132 (see FIG. 6) and the PLAYER+ components 138, 140 consists of two byte-wide paths, one for data input to the PLAYER+ components (i.e., Lines 134, 136), and one for data output from the PLAYER+ components (i.e., Lines 150, 152). Each byte-wide path consists of a parity bit (odd parity), a control bit, and two 4-bit symbols. Each 4-bit symbol passed to a PLAYER+ component from the LPFC is encoded in a 5-bit format for transmission via one of the Fiber Optic Transmitters (Optic Send) 226, 228. Upon reception of a 5-bit symbol from one of the Fiber Optic Receivers (Optic Rec) 230, 232, the PLAYER+ component decodes the symbol back into a 4-bit symbol and passes it to the LPFC. The most significant byte of a pair of bytes is transmitted by PLAYER+ 0 138, and the least significant byte is transmitted by PLAYER+ 1 140.

FIG. 7 is a table of the symbols transferred from the Light Pipe Frame Control to the PLAYER+ components. The symbol pair "JK" 234 represents the Starting Delimiter (SD) for a frame boundary. The "T" symbol 236 represents the Ending Delimiter (ED).

FIG. 8 is a table of the symbols transferred from the PLAYER+ components to the Light Pipe Frame Control. The "I" symbol 242 represents the Idle command. The "H" symbol 244 represents the Halt command. The "JK" symbol pair 234 represents the SD. The "T" symbol 236 represents the ED. The "Q" symbol 246 represents the Quiet command. Finally, all other 5-bit symbols not specified in FIG. 8 are considered to be invalid symbols.

2. Line States

To transmit interface control information, the sending node transmits a repetitive pattern of control symbol pairs. When the receiving node has received the required number of consecutive control symbol pairs, the receiver is defined to be in the corresponding line state. There are seven possible line states.

The Active Line State (ALS) is selected by reception of the SD (JK symbol pair). This State continues while the receiving node receives data symbols and EDs (T symbols). The Idle Line State (ILS) is selected by reception of two Idle-Idle symbol pairs. The Idle Line State indicates the preamble of a frame or the lack of frame transmission during normal operation. The Super Idle Line State is selected by reception of eight consecutive Idle-Idle symbol pairs. This State is used in the preferred embodiment as a Data Link Establishment Acknowledgement. The No Signal Detect State is selected upon the deassertion of the Signal Detect signal. This State occurs when the sending node is powered down, in a stop or reset mode, its clocks are stopped, or there is a break in the physical path to the receiving node. No symbol pair is applicable for this State.

The Master Line State (MLS) is selected by the reception of eight consecutive Halt-Quiet symbol pairs. This State signals a disconnect of the Data Link Layer connection. The Halt Line State (HLS) is selected by the reception of eight consecutive Halt-Halt symbol pairs. This State signals a clearing of the Fiber Optic Interface 56 by the DM 48. The Quiet Line State (QLS) is selected by the reception of eight consecutive Quiet-Quiet symbol pairs. The use of this State is reserved.

3. Data Link Establishment

Data Link establishment is the initial interaction between the Data Mover (DM) 48 and the Host Interface Adaptor (HIA) 52. It verifies the correctness of the physical interconnect between them and establishes that both ends of the data path are ready for general frame traffic. It must precede all general frame traffic. The DM 48 uses an interlocked handshake consisting of requests and acknowledgments with the HIA 52 to establish the Data Link. The entire Data Link establishment process must complete prior to the first order code being received in the DM 48 from the File Cache Handler Software 40 to be successful. An order code is a request for the File Cache System 18 to access a file for the Host computer system 12.

FIGS. 9–14 are flowcharts illustrating the processing steps performed to establish the Data Link. The Data Link establishment process begins with the Start Step 300 on FIG. 9. First, the Data Mover (DM) initializes its PLAYER+ components at Step 302. The DM at Step 304 sends a Halt Line State (HLS) to the Host Interface Adaptor (HIA) on both Fiber Optic Links. If the HIA does not detect the HLS on either of the Fiber Optic Links at Step 306, the process takes the No path 308 and rechecks the Fiber Optic Links until it does detect a HLS. Once a HLS has been detected, the Yes path 310 is taken to Step 312, where the HIA initializes its PLAYER+ components. At Step 314, the HIA determines if a HLS has been received on both of the Fiber Optic Links. If not, the No path 316 is taken and the HIA keeps checking for the HLS until it detects a HLS on both Links.

Once both Halt Line State (HLS) signals are received, the Yes path 318 is taken to Step 320, where the Host Interface Adaptor (HIA) waits for 256 microseconds. Next, at Step 322 the HIA verifies that a HLS is still present on both Fiber Optic Links (i.e., the state of the line has not changed). If a HLS is not present on both Links, then No path 324 is taken to a termination sequence at Step 326, where the HIA sends a Master Line State (MLS) to the DM. At Step 328, the HIA clears its Light Pipe Frame Control (LPFC) and ends processing of the Data Link establishment at Step 330. If a HLS is still present on both Links, the Yes path 332 is taken to Step 334 on FIG. 10. At this Step, the HIA sends a HLS on both of the Fiber Optic Links as an acknowledgment. If a new line state is not received by the DM at Step 336 as a result of the HIA sending HLS, the No path 338 is taken to Step 340. If an order code is received by the DM, then the Data Link establishment process is terminated. Processing follows the Yes path 342 to the End Step 344. If an order code has not been received by the DM, the No path 346 is taken and the DM checks its line state again.

Once a new line state is received by the DM, the Yes path 348 is taken and the DM checks at Step 350 to determine if the new line state is a HLS. If not, the No path 352 is taken and processing stops at Step 344. If the new line state is HLS, the Yes path 354 is taken to Step 356, where the DM waits for 256 microseconds. If after this amount of time, the DM does not have a HLS on both of the Fiber Optic Links (Step 358), the No path 360 is taken and processing ends. If the DM does still have HLS on both Links, the Yes path 361 is taken and processing continues at Step 362, where the DM puts the transmitters of its PLAYER+ components in an Active Line State (ALS), causing Idle symbol streams to be sent down both of the Links.

Figure 11:
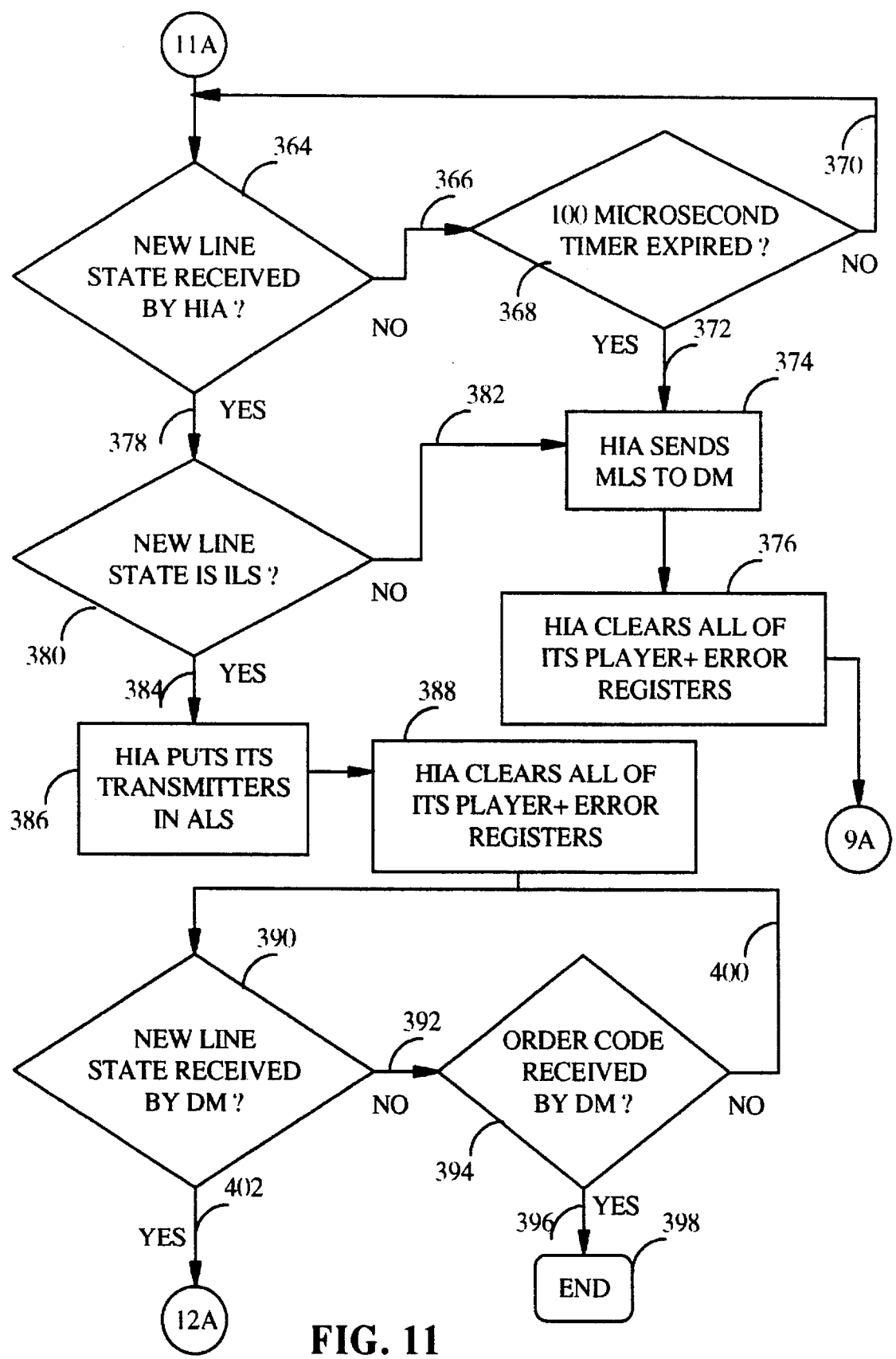
Figure 12:
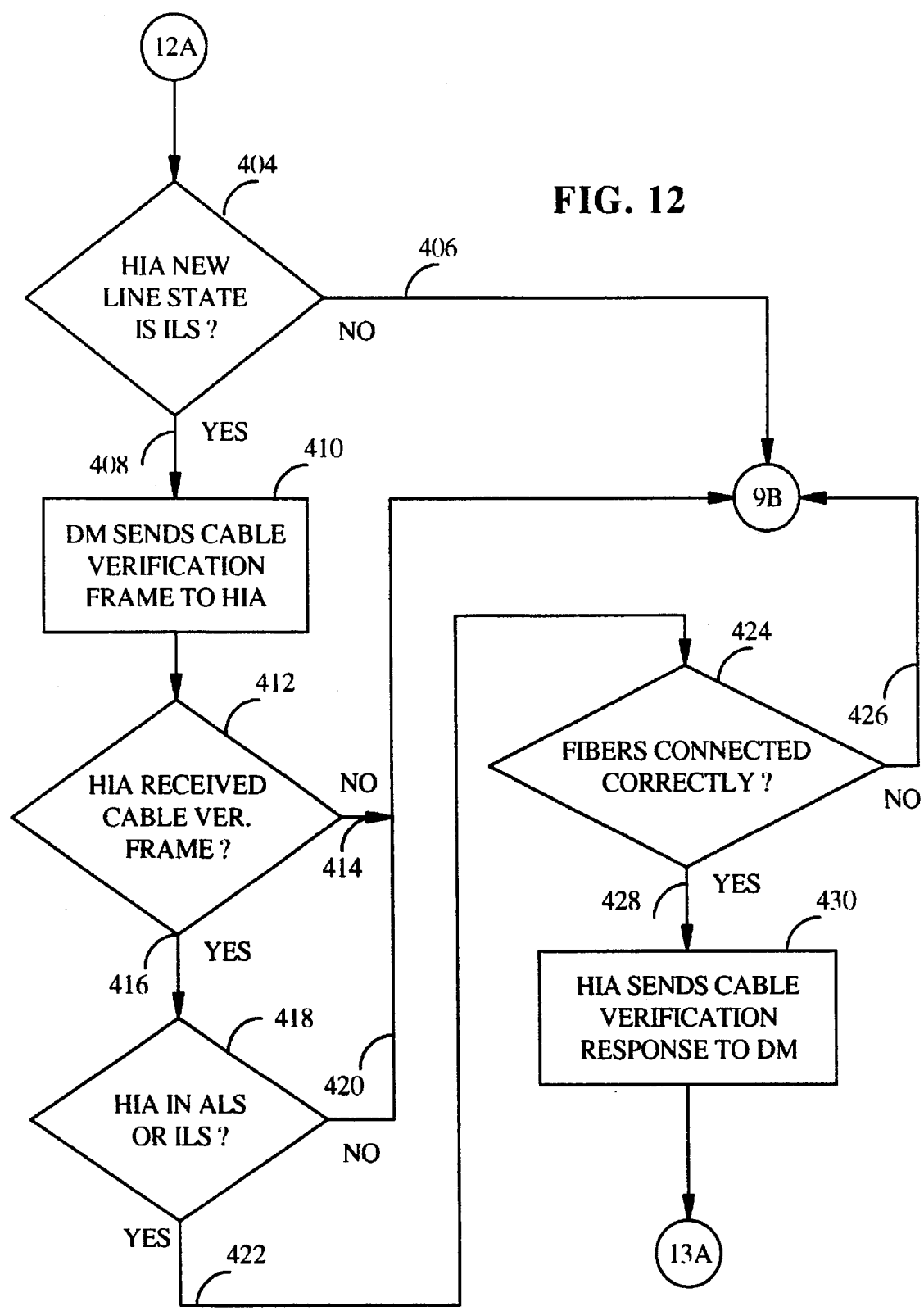
Figure 13:
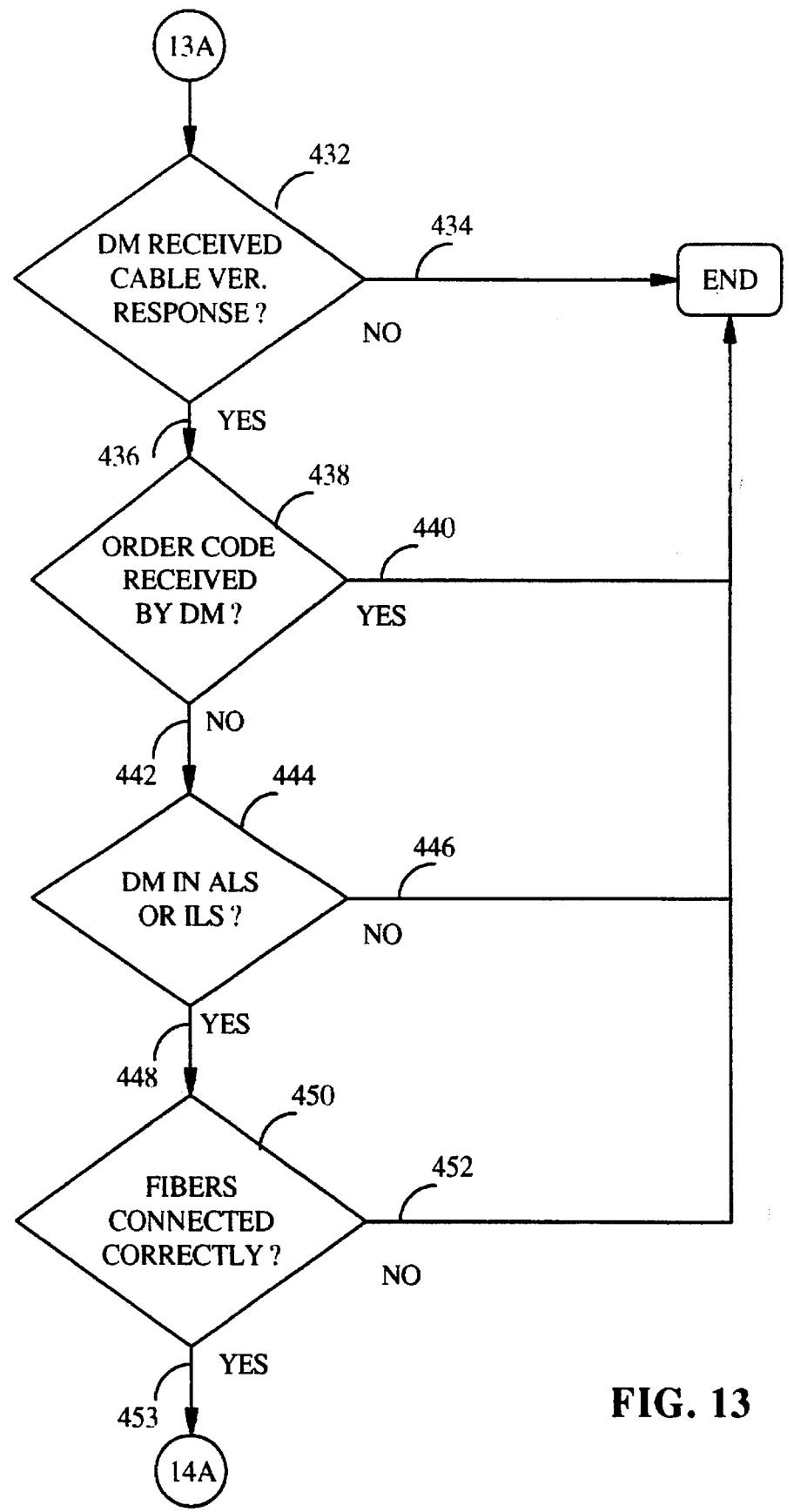
Figure 14:
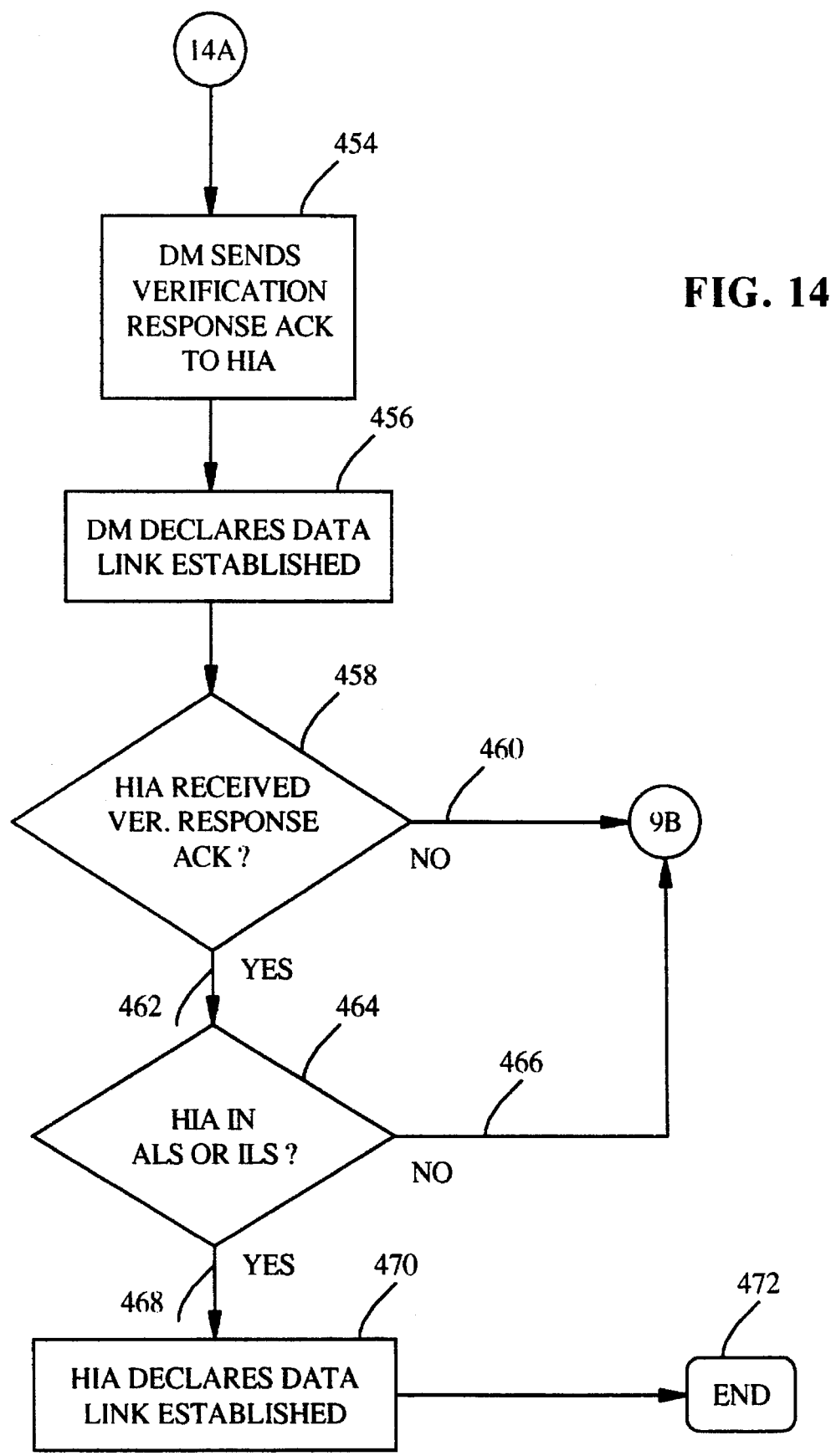

Next, on FIG. 11, the Host Interface Adaptor (HIA) at Step 364 determines if a new line state has been received. If a new line state has not yet been received, the No path 366 is taken and the HIA at Step 368 checks a 100 microsecond timer. If the timer has not expired, the No path 370 is taken back Step 364 to check for a new line state again. If the timer has expired, the Yes path 372 is taken to Step 374, where the HIA sends a MLS to the Data Mover (DM). Next, at Step 376, the HIA clears all of its PLAYER+ error registers and processing continues at Step 306 on FIG. 9.

If a new line state is received by the HIA, the Yes path 378 is taken. The HIA checks at Step 380 to determine if the new line state is the Idle Line State (ILS). The ILS is achieved by receiving the Idle symbol pairs sent by the DM. If the new line state is not ILS, the No path 382 is taken to Step 374, where processing continues as described above. If the ILS has been received, the Yes path 384 is taken to Step 386. At this Step the HIA puts the transmitters in its PLAYER+ components in the ALS. Next, the HIA at Step 388 clears all of its PLAYER+ error registers. The DM then determines at Step 390 if a new line state has been received. If a new line state has not yet been received, the No path 392 is taken to Step 394. If an order code is received by the DM, then the Yes path 396 is taken and processing terminates at Step 398. If an order code has not been received, the No path 400 is taken back to Step 390. If a new line state is received by the DM, then the Yes path 402 is taken and processing continues with Step 404 on FIG. 12.

Figure 9:
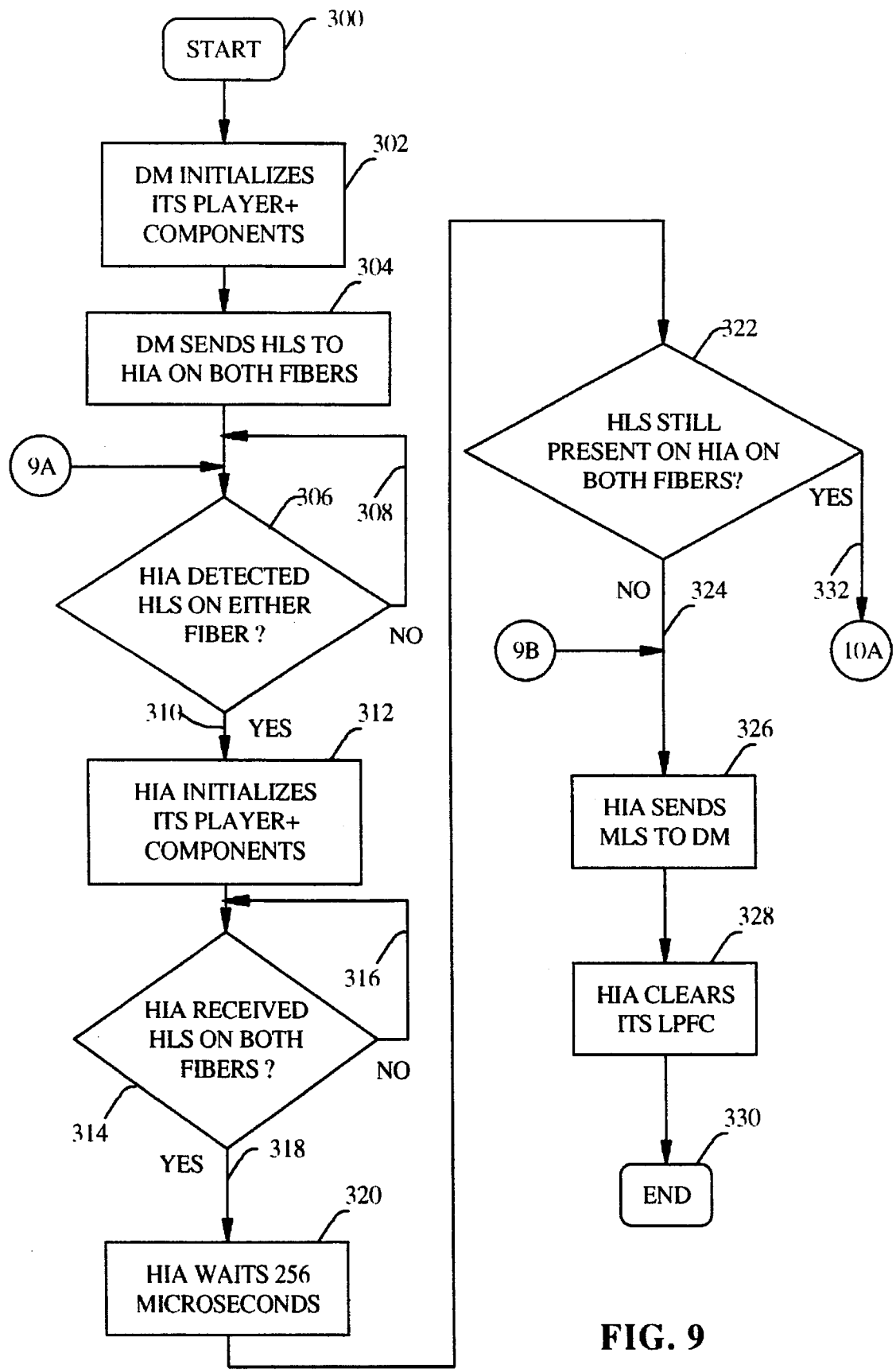
FIGS. 9, 10, 11, 12, 13 and 14 are flowcharts illustrating the processing steps performed to establish the Data Link.
Figure 10:
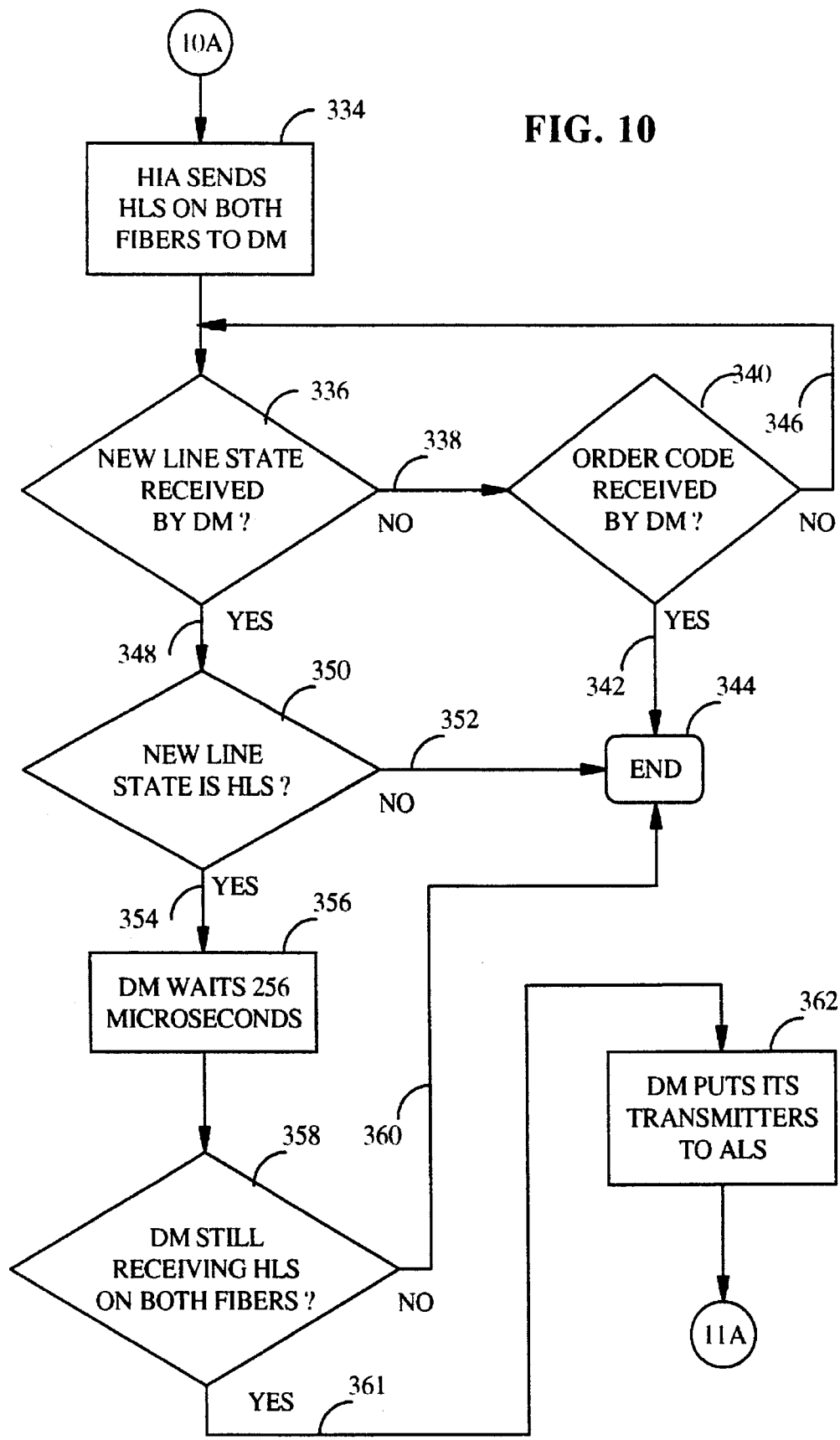

If the new line state detected by the Host Interface Adaptor (HIA) is not Idle Line State (ILS), the No path 406 is taken and processing continues with the termination sequence on FIG. 9. If the new line state is ILS, the Yes path 408 is taken to Step 410, where the Data Mover (DM) sends a Cable Verification Frame to the HIA. If the HIA does not receive this Frame (Step 412), the No path 414 is taken and processing continues with the termination sequence on FIG. 9. If the HIA receives the Frame, the Yes path 416 is taken and the HIA verifies at Step 418 that it is still in ALS or ILS. If not, the No path 420 is taken and processing continues with the termination sequence on FIG. 9. If the HIA is still in ALS or ILS, the Yes path 422 is taken to Step 424. The HIA at this Step determines if the Fiber Optic Links are connected correctly. If they are not connected correctly, the No path 426 is taken and processing continues with the termination sequence on FIG. 9. If the Links are connected correctly, then the Yes path 428 is taken and the HIA at Step 430 sends a Cable Verification Response back to the DM. Processing then continues at Step 432 on FIG. 13.

If the Data Mover (DM) does not receive the Cable Verification Response, the No path 434 is taken and Data Link establishment processing ends. If the Response is received by the DM, then the Yes path 436 is taken and the DM checks at Step 438 if an order code has been received from the Host system. If an order code has been received, the Yes path 440 is taken and processing ends. If an order code has not been received, the Yes path 442 is taken to Step 444, where the DM verifies that it is still in Active Line State (ALS) or Idle Line State (ILS). If not, the No path 446 is taken and processing ends. If the line state is still ALS or ILS, then the Yes path 448 is taken to Step 450. At Step 450 the DM checks its Fiber Optic Links to verify that they are connected correctly. If they are not, the No path 452 is taken and processing ends. If they are connected correctly, the Yes path 453 is taken to Step 454 on FIG. 14.

At Step 454, the Data Mover (DM) sends a Verification Response Acknowledgment to the HIA. The DM at Step 456 then declares the Data Link to be established. If the HIA at Step 458 does not receive the Verification Response Acknowledgment, the No path 460 is taken to the termination sequence on FIG. 9. If the Acknowledgment is received, the Yes path 462 is taken. If the HIA is not in the ALS or ILS (Step 464), the No path 466 is taken to the termination sequence on FIG. 9. If the HIA's line state is ALS or ILS, then the Yes path 468 is taken to Step 470, where the HIA declares the Data Link established. Establishment processing then ends at Step 472. Once the Data Link is established, the DM and the HIA are considered to be logically connected and general information flames may be sent across the interface. Either the DM or the HIA can logically disconnect the Data Link by transmitting a stream of Halt-Quiet symbol pairs to set up a Master Line State. Once the Data Link has been disconnected, the Data Link establishment process must be repeated before flames can be sent once again over the Data Link.

4. Frames

Once the Data Link has been established, all information transmitted between the Data Mover (DM) 48 and the Host Interface Adaptor (HIA) 52 is in the form of frames until the link is logically disconnected. There are three types of flames. The first type of frame is a Functional Frame. Functional Frames carry all command, status, and data between the Host system 12 and the File Cache System 18. The second type of frame is an Acknowledge Frame. Acknowledge frames contain only Data Link control information used for flow control and Data Link error recovery. The third type of frame is a Contact frame. It is used only for Data Link error recovery.

Figure 15:
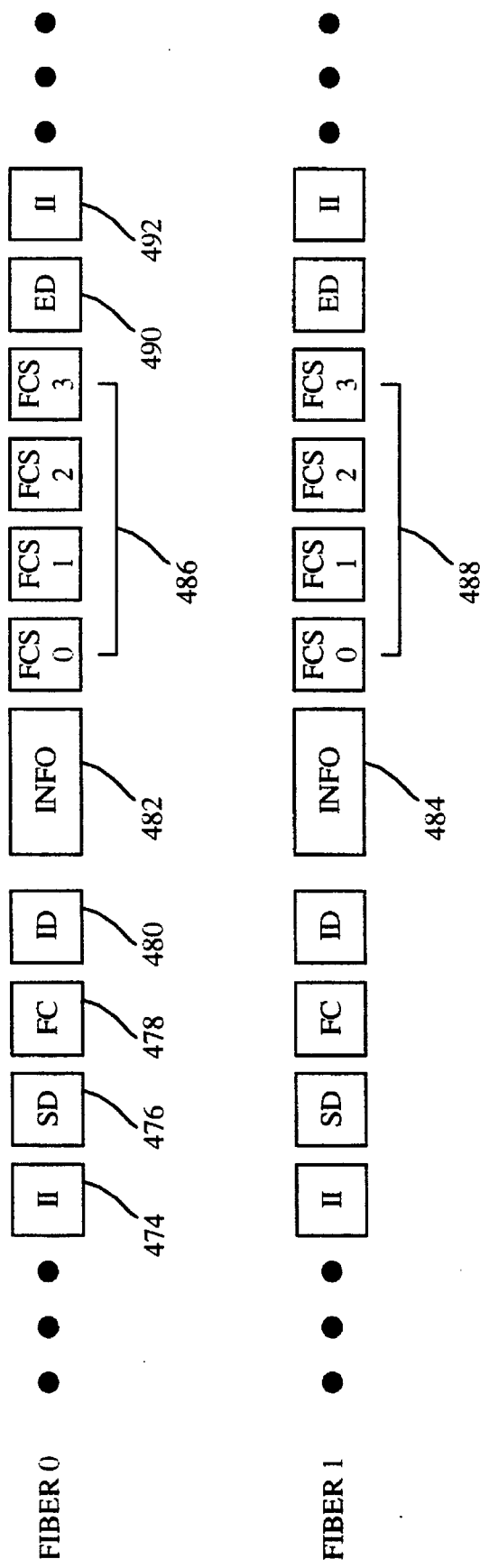
FIG. 15 is a diagram of the general format of frames transmitted on the Fiber Optic Interface.

FIG. 15 is a diagram of the general format of flames transmitted on the Fiber Optic Interface. This format is used on the interface between the Light Pipe Frame Control (LPFC) 132 and the PLAYER+ components. Even though the preferred embodiment of this invention is a dedicated point-to-point Fiber Optic Interface, a non-FDDI application (i.e., it is not a token ring LAN), the general rules for FDDI framing must be followed on each fiber. In particular, each frame on each fiber must start with a valid FDDI starting delimiter (SD) and end with a valid FDDI ending delimiter (ED) on each fiber. Furthermore, the frame size must be between three and 4500 bytes long. However, in the preferred embodiment, the data transfer size is limited to 127 36-bit words (508 bytes) for system performance reasons. This limitation satisfies the maximum frame length limitation and also allows frame types other than data transfer frames to be interleaved with long data transfers. In the preferred embodiment, each frame contains two bytes of the FC field (one byte per fiber), two bytes of the ID field (one byte per fiber), eight bytes of the FCS field (four bytes per fiber), and 0 to 508 bytes of data (0 to 254 bytes per fiber). In FIG. 15, each block shown is one 8-bit byte of information transmitted over the Fiber Optic Links, except for the Information (INFO) field, whose length is a variable number of bytes. Fiber 0 represents Fiber Optic Link 142 from FIG. 6 and Fiber 1 represents Fiber Optic Link 144.

The contents of a frame transferred over the Fiber Optic Interface are as follows. The Preamble field, consisting nominally of 16 Idle symbols (a maximum frequency signal that is used for establishing and maintaining clock synchronization), precedes every transmission. Portions of the Preamble are shown as "II" symbol pairs 474. All frames begin with a start of frame delimiter on both Fiber Optic Links. The Starting Delimiter (SD) field 476 contains a "JK" symbol pair used to denote the starting boundary of a data transmission sequence. The occurrence of this symbol pair allows the receiving PLAYER+ components to establish symbol pair boundaries in addition to signalling the start of the frame. The PLAYER+ components also use the incoming "JK" pairs on each fiber to deskew information received over the two Fiber Optic Links. Generation of the SD is a function of the Physical Layer and is transparent to the Data Link layer protocol. The SD 476 is transmitted on each fiber simultaneously.

The Frame Control (FC) field 478 identifies the type of frame and its characteristics. FIG. 16 is a diagram of the format of the Frame Control field. The FC field contains control information for the frame that indicates how the receiver should interpret the remainder of the frame. The FC field 478 has a length of one byte, which is transmitted on both fibers simultaneously. The higher four bits (bits 0–3) of the FC 478 are master-bitted to indicate the frame's major category and the lower four bits (bits 4–7) are master-bitted to indicate the frame's sub-category as shown. The major categories are 36-bit Mode Data, 32-bit Mode Data, Activity Control Block (ACB) Transfers, and Acknowledge/Negative Acknowledge (ACK/NAK). The sub-categories are Partial Transmission, Last Transmission, Abort Transfer, Command/Status, Reconnect Read, Reconnect Write, UPI Message, Acknowledge, Negative Acknowledge, Fatal Error, and Contact Frame. Only one major category bit and one sub-category bit is set for each FC field.

Returning to FIG. 15, the Identification field 480 contains different information for each of the three types of frames. The contents the ID field will be discussed further below.

The Information field 482 on Fiber 0 contains the even bytes of data supplied by the sending node. The Information field 484 on Fiber 1 contains the odd bytes of data supplied by the sending node.

The Frame Check Sequence (FCS) field 486 is a cyclic redundancy check used to detect erroneous data bits within the frame as well as the erroneous addition or deletion of bits to or from the frame. The FCS value is four bytes long. The SD 476 and Ending Delimiter (ED) 490 fields are not covered by the FCS. All other fields in the frame, including the FCS field itself, are covered by the FCS. The FCS field 486 always starts on an even byte boundary. The FCS is calculated separately for each fiber. The FCS 486 is computed from the frame transmitted on Fiber 0. The FCS 488 is computed from the frame transmitted on Fiber 1. Generation, transmission, and checking of the FCS is a function of the Physical Layer and is transparent to the Data Link Layer. The Data Link Layer is only aware of whether or not an error has been detected. The FCS polynomial following the data in a frame provides verification of the integrity of the data that has been transmitted. The algorithm for this standard polynomial is found in the ANSI/IEEE Standard 802.5-1985, "Token Ring Access Method and Physical Layer Specifications."

The ED field 490 is a "TT" symbol pair that terminates all normal data transmissions. It signifies that the frame is ended and the four bytes that preceded it on each fiber should be interpreted as the FCS. The ED 490 is transmitted on both fibers simultaneously. Generation of the "TT" symbol pair is a function of the Physical Layer and is transparent to the Dam Link Layer. The ED 490 must be followed by at least eight Idle symbol pairs ("II") prior to the next frame. This Idle (II) field 492 indicates the normal condition of the Link between transmissions. It provides a continuous fill pattern to establish and maintain clock synchronization. A minimum of sixteen IDLE symbols must be transmitted on each fiber between data transmissions. Generation of Idle symbols is a function of the Physical Layer and is transparent to the Data Link Layer.

a. Functional Frames

The format of a Functional Frame is the same as that of the general frame format shown in FIG. 15, except for the ID field. On Fiber 0, the ID field 480 contains an Activity Control Block Identifier (ACB ID). On Fiber 1, the ID field 480 contains a Sequence Number ranging from 0 to 15. These data items are used by DM 48 and HIA 52 control logic to route and manage data transmissions. Sequence numbers are used to correlate subsequent Acknowledge/Negative Acknowledge frames to the present frame. Activity Control Block IDs are identifiers used by the File Cache System 18 microcode to manage tasks required to stage and de-stage portions of user files.

Figure 17:
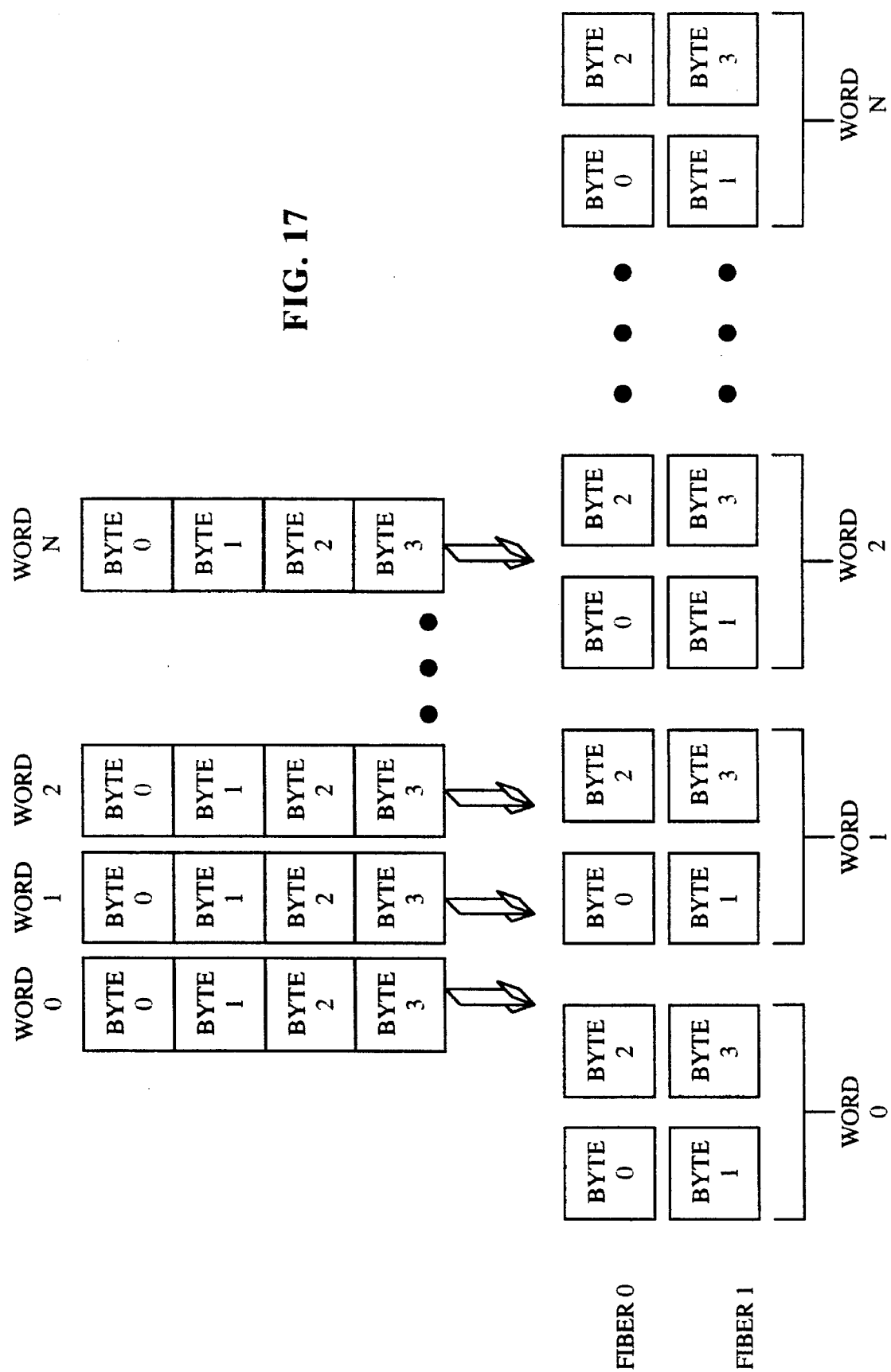
FIG. 17 is a block diagram showing the format for packing data into the Information field of a Functional Frame.

Most Functional Frames have an Information field 482 that represents one command frame, one status frame, or one data frame. The 32-bit words used on SEND FXFA/LPFC interface are split into eight-bit bytes and placed in the frame. FIG. 17 is a block diagram showing the format for packing data into the Information field of a Functional Frame. All even bytes are transmitted on Fiber 0 and all odd bytes on Fiber I as shown.

Data transfer operations that exceed 504 bytes in length are segmented into multiple frames for transmission. The maximum length of the Information field 482 in any frame is 504 bytes. The Sub-Category indicator in the Frame Control field 478 for Partial Transmission is set if there is more data to be transmitted for this data transfer after this frame has been transmitted. The transmission may be continued in the next frame or several frames later. When the data transfer is resumed, the ID field 480 will be the same as for the last data frame for the data transfer. The Sequence Number will not be the same as for the last data frame for this data transfer. When the number of bytes of data to be transmitted or the number of bytes of data left to be transmitted is 504 or less, then the Sub-Category indicator Last Transmission is set, indicating that this is the last data frame for this data transfer.

Command frames are always transmitted from the Data Mover (DM) 48 to the Host Interface Adaptor (HIA) 52. Status frames are always transmitted from the HIA to the DM. The ID field 478 of a Command/Status frame provides the identification required for correlation to a specific data transfer operation. Sub-Category indicator Command/Status in the Frame Control field 478 specifies that the frame is a command or status frame, depending on which end of the Fiber Optic Interface is transmitting. Sub-Category indicator Reconnect Read is set when the File Cache System 18 indicates that a read data transfer is about to occur for a read data transfer request that has been received and determined to be a hit in the file cache. Sub-Category indicator Reconnect Write is set when the File Cache System is requesting that a data transfer commence for a write data transfer command that has been received and determined to be a hit in the file cache. Reconnect frames do not contain an Information field.

b. Acknowledge/Negative Acknowledge Frames

Figure 18:
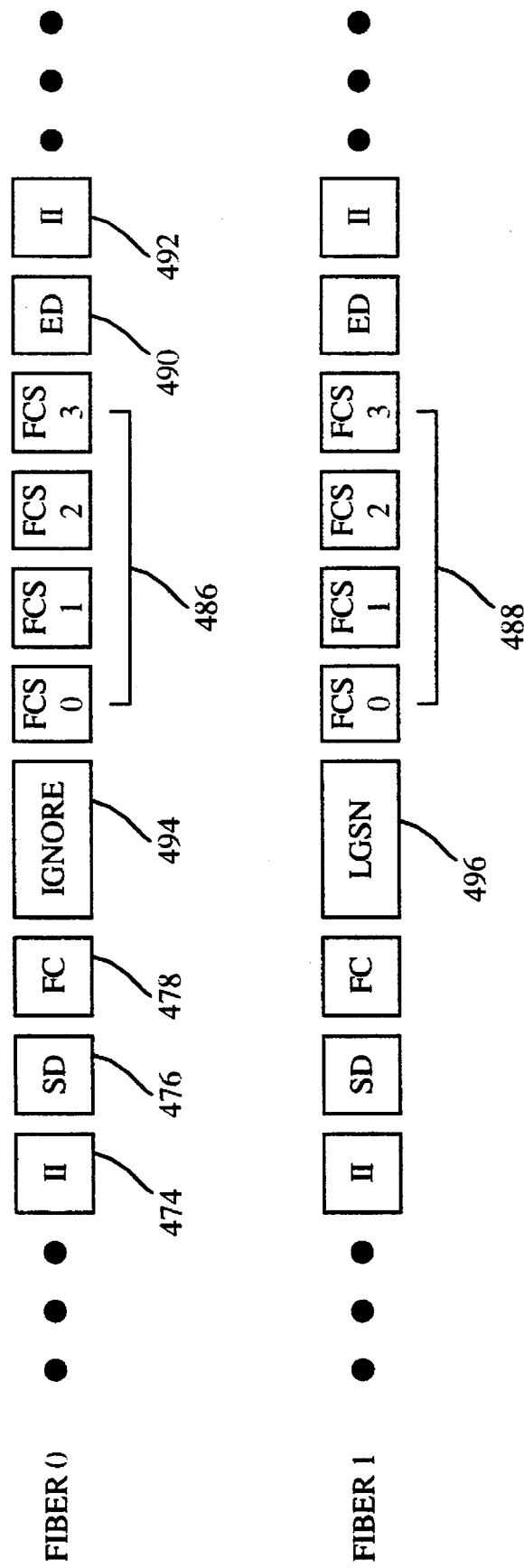
FIG. 18 is a diagram of the format of an Acknowledge/Negative Acknowledge Frame transmitted on the Fiber Optic Interface.

Acknowledge/Negative Acknowledge (ACK/NAK) Frames are sent in response to all Functional Frames that are received. Transmission of this frame type takes precedence over transmission of all other frame types. Acknowledge Frames signify that the corresponding frame or flames were correctly received. Receipt of an Acknowledge Frame does not imply that execution of a previously sent frame has been started or accomplished (for example, if the previously sent frame was a command frame). Negative Acknowledge Frames indicate a lost or corrupted frame and cause the sender of the lost or corrupted frame to retransmit that frame and all subsequent frames. FIG. 18 is a diagram of the format of an Acknowledge/Negative Acknowledge Frame transmitted on the Fiber Optic Interface. The format of these ACK/NAK frames is similar to the general frame format except that the ID field 480 has a different meaning and there is no Information field 482. Instead, the ID field 494 on Fiber 0 is ignored, but the ID field 496 on Fiber 1 contains the Last Good Sequence Number (LGSN) of the frame that was received correctly.

c. Contact Frames

Figure 19:
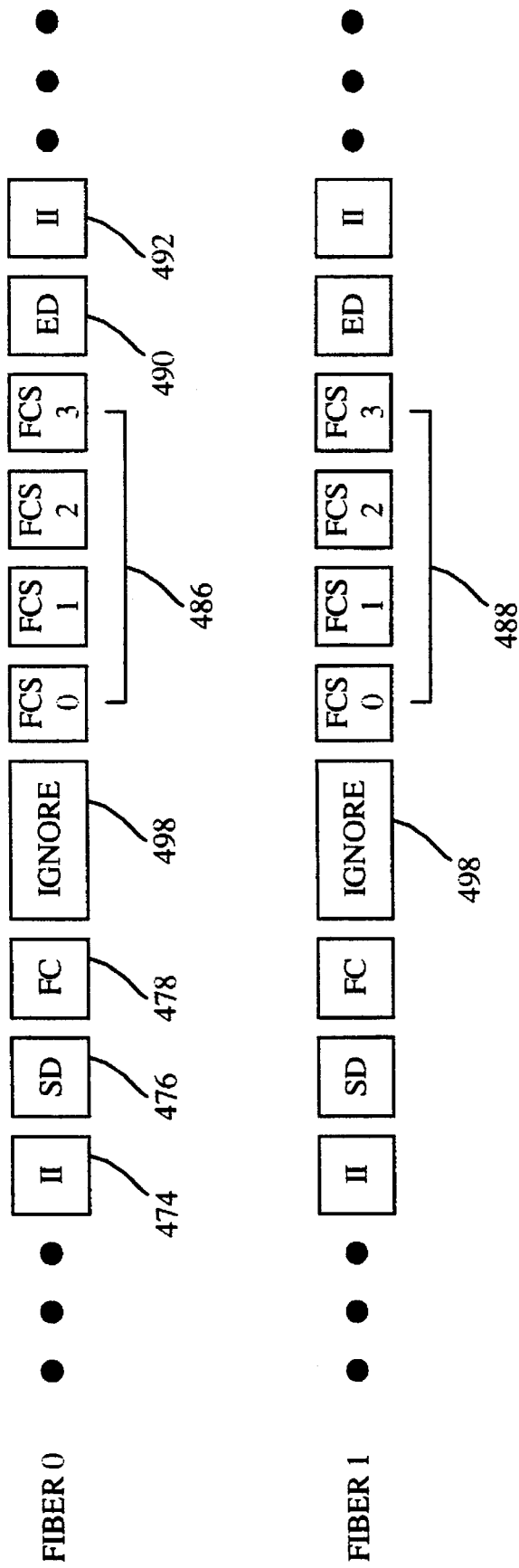
FIG. 19 is a diagram of the format of a Contact Frame on the Fiber Optic Interface.

FIG. 19 is a diagram of the format of a Contact Frame on the Fiber Optic Interface. The ID field 498 is ignored and may have any value. There is no Information field.

5. Frame Flow Control

There are multiple frame transmit buffers and multiple receive frame buffers on each end of the Fiber Optic Interface. In the preferred embodiment them are eight frame transmit buffers and eight receive frame buffers. The buffers are filled and emptied in a circular fashion, logically forming eight-deep FIFO queues. Each buffer holds one Functional Frame.

As described above, Functional Frames are Data, Command, or Status Frames. Functional Frames contain data that is used by other components of the Host 12 system and File Cache System 18 besides the Fiber Optic Interface 56. The purpose of the Fiber Optic Interface is to transfer this information. Acknowledge and Negative Acknowledge Frames are used only to control and verify the passing of Functional Frames over the Fiber Optic Interface.

The File Cache System 18 uses a timed sliding window protocol to control the transmission of Functional Frames across the Fiber Optic Interface. This flow control protocol is designed to maximize the efficiency of the Fiber Optic Interface, prevent information overflows, detect errors, and retransmit frames when passive transmission errors have occurred.

Sequence numbers are central to Functional Frame control. Each Functional Frame is assigned a Sequence Number, which is transmitted with the frame. Sequence Numbers are assigned in ascending, sequential order. In the preferred embodiment, counters with a size of four bits are used to generate the Sequence Numbers. However, the size of the counter generally would be 1+Log (base 2) N, where N is the number of transmit and receive buffers. The Sequence Number is checked when the frame is received to ensure it is sequential to previously received frames. If the Sequence Number is acceptable, the receiver buffers the frame and checks it for other errors. If no other errors are found, the frame is validated. The frame is then sent toward its final destination elsewhere within the File Cache System and its buffer is reused.

The receiver of the Functional Frame sends Acknowledge Frames for each Functional Frame it receives without error. Acknowledge Frames are sent only when a frame is received and the number of valid receive frame buffers is less than or equal to four, or when the number of valid receive buffers make the transition between five and four. Transmission of Acknowledge Frames occur at the next frame break on the transmit path of the end of the Fiber Optic Interface that received the frame. A Functional Frame is sent only when three or less frames have been sent that have Acknowledges outstanding. These restrictions prevent the transmission of a frame for which there is no available receive buffer on the other end of the Fiber Optic Interface.

The timed sliding window protocol uses compressed acknowledges. When an Acknowledge Frame is received, it is effectively acknowledging all frames since the one that was last acknowledged, up to and including the one whose Sequence Number is included in the Acknowledge Frame. Negative Acknowledge Frames acknowledge all frames since the one that was last acknowledged, up to and including the one whose Sequence Number is included in the Last Good Sequence Number field 496. All frames sent after that are considered bad and must be retransmitted.

If a passive error is detected in a Functional Frame, a NAK Frame is generated by the receiver and sent as soon as there are four or less valid frames in the receiving FXFA. It includes the Sequence Number of the last good frame it received so that the sender can resend the defective frame and all frames that have subsequently been sent. After the receiver detects the error, it ignores all frames that it receives (except ACKs and NAKs) until it successfully receives the retransmission of the Functional Frame that was in error. The retransmitted frames will have their original Sequence Numbers.

A Functional Frame must be retained in its transmit buffer at the sending end of the Fiber Optic Interface until that frame has been acknowledged, in case a retry becomes necessary.

Two timers are used by the protocol, an Acknowledge Timer and a Negative Acknowledge Timer. The ACK Timer interval is 200 milliseconds and the NAK timer interval is 400 microseconds. The ACK timer is initialized whenever a Functional Frame is sent. It is running whenever there are pending acknowledges for Functional Frames that have been sent. If this timer expires, the sender goes into "contact mode." The sender sends a Contact Frame to the receiver. If the ACK Timer expires for the Contact Frame, the sender normally considers this to be a fatal error and the error is reported to the maintenance processing component of the File Cache System. Contact Frames are retried indefinitely on Contact Frame timeouts. The receiver always responds to a Contact Frame with a NAK. When the sender receives the NAK, it responds by sending all Functional Frames that it has sent since the Last Good Sequence Number specified in the NAK.

The Negative Acknowledge Timer is initialized and activated whenever a NAK is sent. If the NAK Timer expires before the retransmission is received, the NAK is retransmitted once.

Corrupted symbols on the Fiber Optic Interface may result in a "lost frame" scenario. This is particularly true when the corruption of symbols at the start of a frame makes it difficult or impossible for the receiver to recognize that the start of a frame has occurred. The lost frames are detected via an improper sequence number. In this case, the sender's ACK Timer will expire, causing the sender to go into "contact mode." In this mode, the sender sends a Contact Frame and waits for a NAK for the frame. The receiver will send a NAK in response to the Contact Frame. When the sender receives the NAK, it resends the lost frame and terminates "contact mode."

The sender, upon detection of a NAK, finishes transmission of the present frame. It then initiates retransmission starting at the beginning of the frame for which the NAK was received. Retransmissions may take place continuously as long as NAKs are received.

D. Light Pipe Frame Control (LPFC)

1. Functional Description

The Light Pipe Frame Control (LPFC) 132 (see FIG. 4A) provides access to the PLAYER+ components 138, 140. It also contains an interface to the MicroSequencer Bus Controllers (USBCs) 94, 96 and a Control Bus (CBUS) (not shown) interface to the PLAYER+ components. The USBC interface 104 is used to control the initialization, interrupt setting, and error reporting of the LPFC 132. The CBUS interface is used to initialize and interrogate control and status registers on the PLAYER+ components. The LPFC is designed specifically for a dedicated point-to-point Fiber Optical Interface. The LPFC is a 448 CMOS VLSI option with 256 pins, 196 of which are available for functional use.

in the transmit direction, the LPFC 132 takes 32-bit data word packets, each containing four 8-bit bytes, from the sending Frame Transfer Facility (FXFA) 130, synchronizes them to the 12.5 MHz local oscillator, and reformats and encodes them into frames for transmission to the PLAYER+ components. The LPFC puts the Starting Delimiter (SD) 476 on the front of each frame. Each frame is constructed by the LPFC using 9-bit bytes, eight bits for data and one bit for control. The LPFC generates the Frame Check Sequence (FCS) 486, 488 and includes it in each frame. The LPFC also appends the Ending Delimiter (ED) 490 to the end of each frame. It then sends the frame to the transmit portion of the Media Access Controller (MAC) interface of the PLAYER+ components in an 18-bit code (double byte wide) for subsequent transmission on the Fiber Optic Links.

In the receive direction, the LPFC 132 accepts the data from the 18-bit MAC receive interface of the PLAYER+ components. It verifies the packet format by looking for data symbols between the SD 476 and ED 490, and performs a FCS check. It then packs the double byte wide data into 32-bit words, resynchronizes them to the system clock, and presents the data to the REC FXFA 156. If no errors are detected by the LPFC, it indicates to the REC FXFA 156 that the data was good. If an error is detected by the LPFC 132, it directs the REC FXFA 156 to discard the data.

2. LPFC Components

There are two major components that are used in the Light Pipe Frame Control (LPFC).

The first component is a 40-bit wide, eight word deep Asynchronous First-In-First-Out (FIFO) buffer. It provides asynchronous boundary handling and speed matching logic between the logic driven by the System Clock and logic driven by the Local Clock. The FIFO's operation is under the control of these two independent clocks. The buffer is filled by an incoming stream of 40-bit words in a circular fashion. Each of the eight buffer locations have valid flags which are set when the corresponding buffer location is loaded with a new data word from the incoming stream. The valid flags are resynchronized to the output clock. Output control logic tests the resynchronized valid flags in a circular fashion, waiting for each valid flag in turn to be set. When the valid flag goes active, the word in the corresponding buffer location is output and its valid flag is cleared. The FIFO can throttle the incoming stream of data as necessary. It also detects overrun and underrun errors.

The second major component is the Frame Check Sequence (FCS) logic, which takes an 8-bit wide data stream and generates the 32-bit FCS value used for error detection purposes.

3. Transmitter Logic

The Transmitter logic receives data from the Send Frame Transfer Facility (SEND FXFA), resynchronizes the data to the Local Clock, puts the data in packet form, and passes the packet to the transmit section of the PLAYER+ components.

Figure 20:
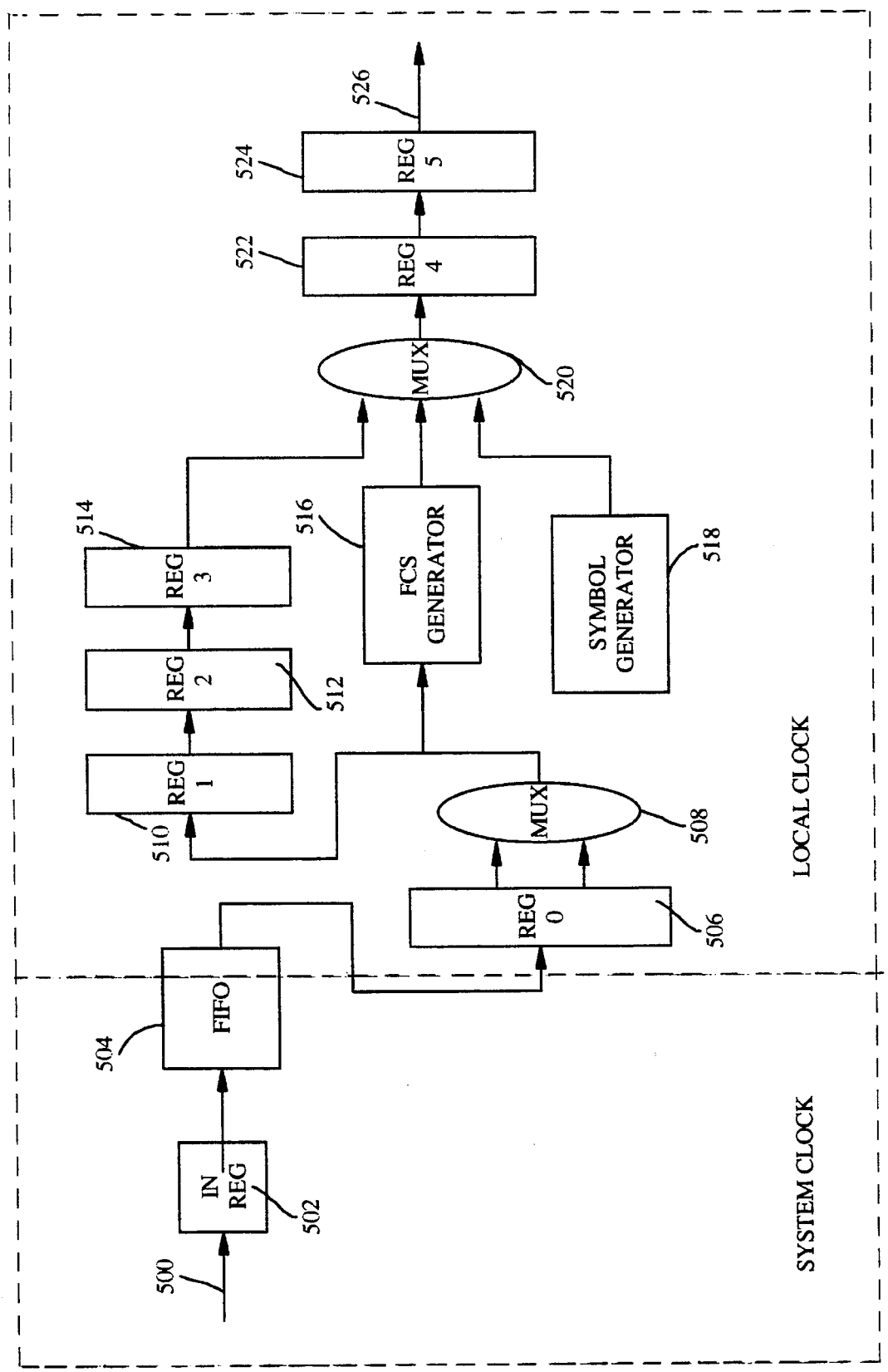
FIG. 20 is a block diagram of the Transmitter logic of the Light Pipe Frame Control gate array.

FIG. 20 is a block diagram of the Transmitter logic of the Light Pipe Frame Control gate array. When the SEND FXFA 128 has no data to transmit, signals Write Data Transfer (not shown) and Write Data Valid (not shown) are inactive. The Write Data Transfer signal is active during transmission of an information packet from the SEND FXFA 128 to the LPFC 132. Transition of this signal from inactive to active by the SEND FXFA signifies the start of a new information packet. Transition of this signal from active to inactive signifies the end of an information packet. The Write Dam Valid signal is driven active by the SEND FXFA to indicate to the LPFC that the current contents of the 32 Write Data lines 500 is the next valid word of the information packet to be sent across the Fiber Optic Links.

The data word is taken off the Write Data lines 500 and stored in the Input Register (IN REG) 502. This information consists of 32 bits of data and two bits of parity. The data is then loaded into an Asynchronous FIFO 504 under the control of the System Clock. The data is resynchronized to the Local Clock in the Asynchronous FIFO 504 and is output from the FIFO to Register 0 (REG 0) 506 under control of the Local Clock. The 32-bit data word is split into two 16-bit words and loaded into the transmit pipeline via Multiplexor (MUX) 508 on two successive 80 nanosecond cycles. The transmit pipeline consists of three registers (Register 1 510, Register 2 512, and Register 3 514) connected in series.

Separate FCS values are generated for each of the two byte-wide paths in the transmit pipeline. The data is passed by MUX 508 to FCS Generator logic 516. Each of the byte-wide paths is fed into a separate section of the FCS Generator logic. Each FCS Generator logic section generates a 32-bit FCS value which is inverted and appended to the end of its data stream. At the end of the transmit pipeline, frames are formed using information from Symbol Generator logic 518, the data path, the FCS Generator 516, and MUX 520. The Symbol Generator logic 518 provides the Starting Delimiter (SD) and the Ending Delimiter (ED) for the frame. The frame is then encoded into a 9-bit PLAYER+ code and stored in Register 4 (REG 4) 522. The frame is then output from Register 5 (REG 5) 524, each byte being sent to one of the two PLAYER+ components every 80 nanoseconds for transmission on one of the two transmit Fiber Optic Links. The frame is sent on 16 Transmit Data lines 526.

When there are no data packets to send, the Symbol Generator 518 outputs a stream of Idle symbol pairs.

The Transmitter logic can be disabled under control of a Micro Sequencer Bus Controller.

4. Receiver Logic

The Receiver logic receives data packets from the receive section of the PLAYER+ components, translates them, checks them for errors, resynchronizes them to the System Clock, and passes them to the receiving FXFA.

Figure 21:
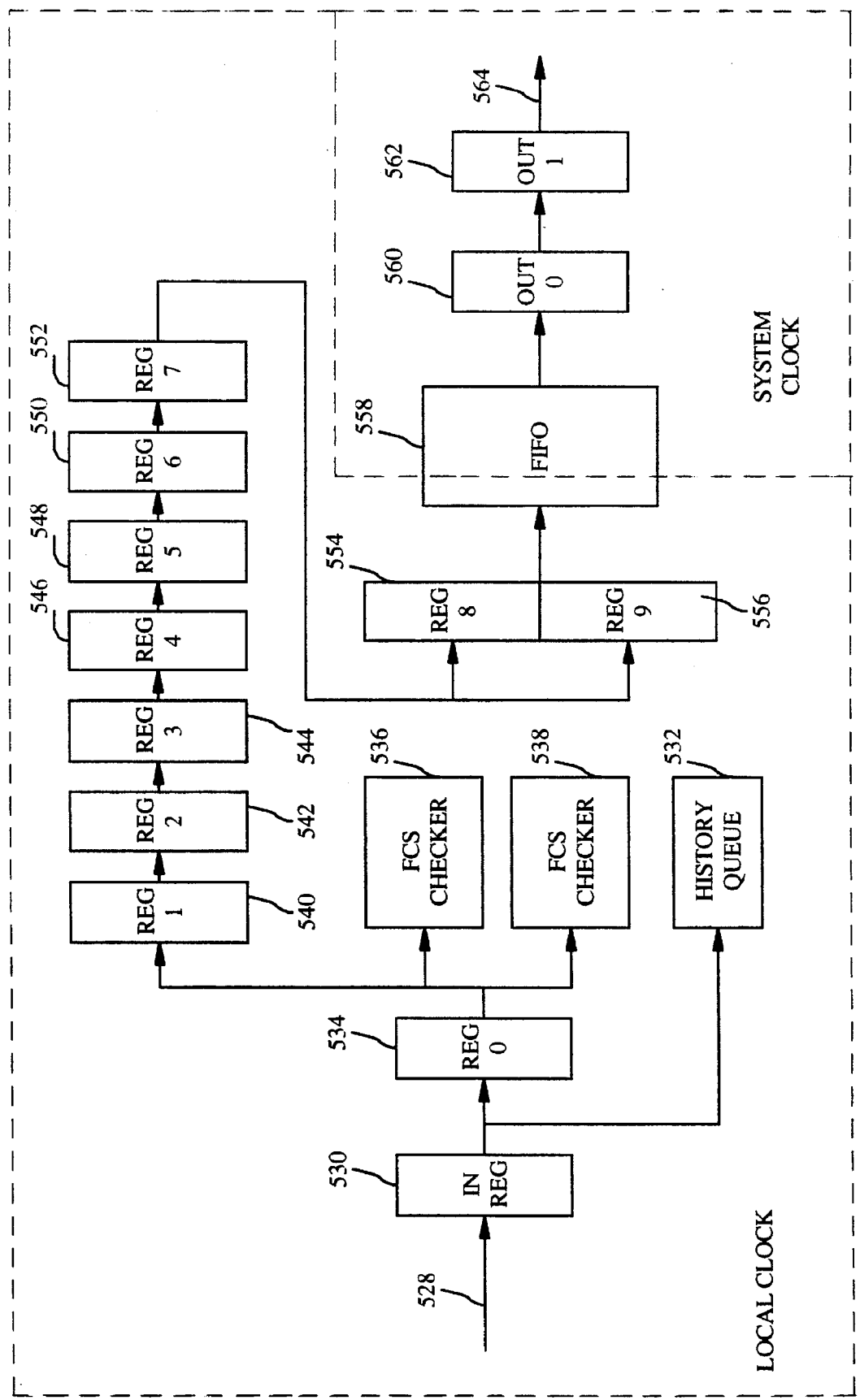
FIG. 21 is a block diagram of the Receiver logic of the Light Pipe Frame Control gate array.

FIG. 21 is a block diagram of the Receiver logic of the Light Pipe Frame Control gate array. Each of the two PLAYER+ components send a stream of 9-bit encoded information representing control symbols and data information to the LPFC 132. The data is received on 16 Receive Data lines 528 and stored in the Input Register (IN REG) 530. The two streams are concatenated as they are stored into IN REG 530. The data is passed to the History Queue 532 and Register 0 (REG 0) 534. The data is then checked by dual FCS Checker logic sections 536, 538 to determine if the FCS value is correct, indicating a good transmission of the data over the Fiber Optic Links. Each byte stream is treated independently for FCS checking. A new FCS is generated for each incoming byte stream and compared with the received FCS values. This redundancy insures that any single error in the FCS logic at either end of the Fiber Optic Interface is immediately detected. The FCS values must be equal and must be the inverse of the received FCS code before the data packet is validated.

The data is passed through a receive pipeline consisting of seven registers 540, 542, 544, 546, 548, 550, and 552. As the stream of data passes through the receive pipeline, it is decoded, checked for protocol and data errors, and reformatted into 32-bit words by storage in Register 8 (REG 8) 554 and Register 9 (REG 9) 556.

Next, these 32-bit words are resynchronized to the System Clock. They are loaded into an Asynchronous FIFO 558 under control of the Local Clock from REG 8 554 and REG 9 556 and removed under control of the System Clock. The data is extracted from the Asynchronous FIFO 558 and stored in Output Register 0 (OUT 0) 560. The data then passes to Output Register 1 (OUT 1) 562 for transmission to the REC FXFA 156 over 32 Read Data Transfer lines 564.

The Light Pipe Frame Control (LPFC) 132 presents the data packet to Receive Frame Transfer Facility (REC FXFA) by raising a Read Data Transfer line (not shown) at the beginning of each packet. This signal remains high throughout the transfer of the packet to REC FXFA 156. A Read Data Valid line (not shown) is activated by the LPFC 132 each cycle that the Read Data Transfer lines contain the next valid data word. When the last word of the transfer is being passed, a Read Last Word line (not shown) is also active. The LPFC then drops the Read Data Transfer lines, followed by either a success or a failure line on the subsequent cycle. If the success line is activated, the REC FXFA processes the packet normally. If the failure line is activated, the REC FXFA discards the packet. If an error occurs on a SD or on the first six data bytes from either of the PLAYER+ components, a lost packet results. Then the interface to the REC FXFA stays idle for the lost packet.

The LPFC 132 contains an eight deep receive History Queue 532. Each data word received from the PLAYER+ components is put into the History Queue 532 as it is received. If an error occurs, the History Queue is disabled, saving the last eight words received prior to the error.

The Receiver logic can be enabled and disabled under control of the Micro Sequencer Bus Controller. When it is disabled, it will still recognize and respond to the Halt Line State (HLS). When the Receiver logic is disabled while a data packet is being received, that packet will be received normally. Once the Receiver logic is disabled, the LPFC 132 ignores the incoming symbol streams, except for the HLS.

D. Frame Transfer Facility (FXFA)

The Frame Transfer Facility (FXFA) is a 448 CMOS technology, 256 functional pin gate array. It is used on the Dam Mover (DM) 48 and Host Interface Adaptor (HIA) 52 components. The FXFA buffers data in data blocks consisting of 127 32-bit words. This buffered data is to be sent across the Fiber Optic Links via the LPFC 132 or has been received from the LPFC. There are two FXFA's for each LPFC, one to send data and one to receive data. The FXFA builds the FC fields for each frame to indicate the type of frame being transmitted. The FXFA also maintains a Sequence Number for each frame. Sequence Numbers are used to keep track of the order in which frames are sent and received across the Fiber Optic Links. As frames are sent across the interface, the receiving FXFA sends an ACK to the transmitting FXFA on the other side of the Fiber Optic Interface if there were no errors in transmission. Otherwise it sends a NAK to direct the transmitting FXFA to resend the data.

Figure 22:
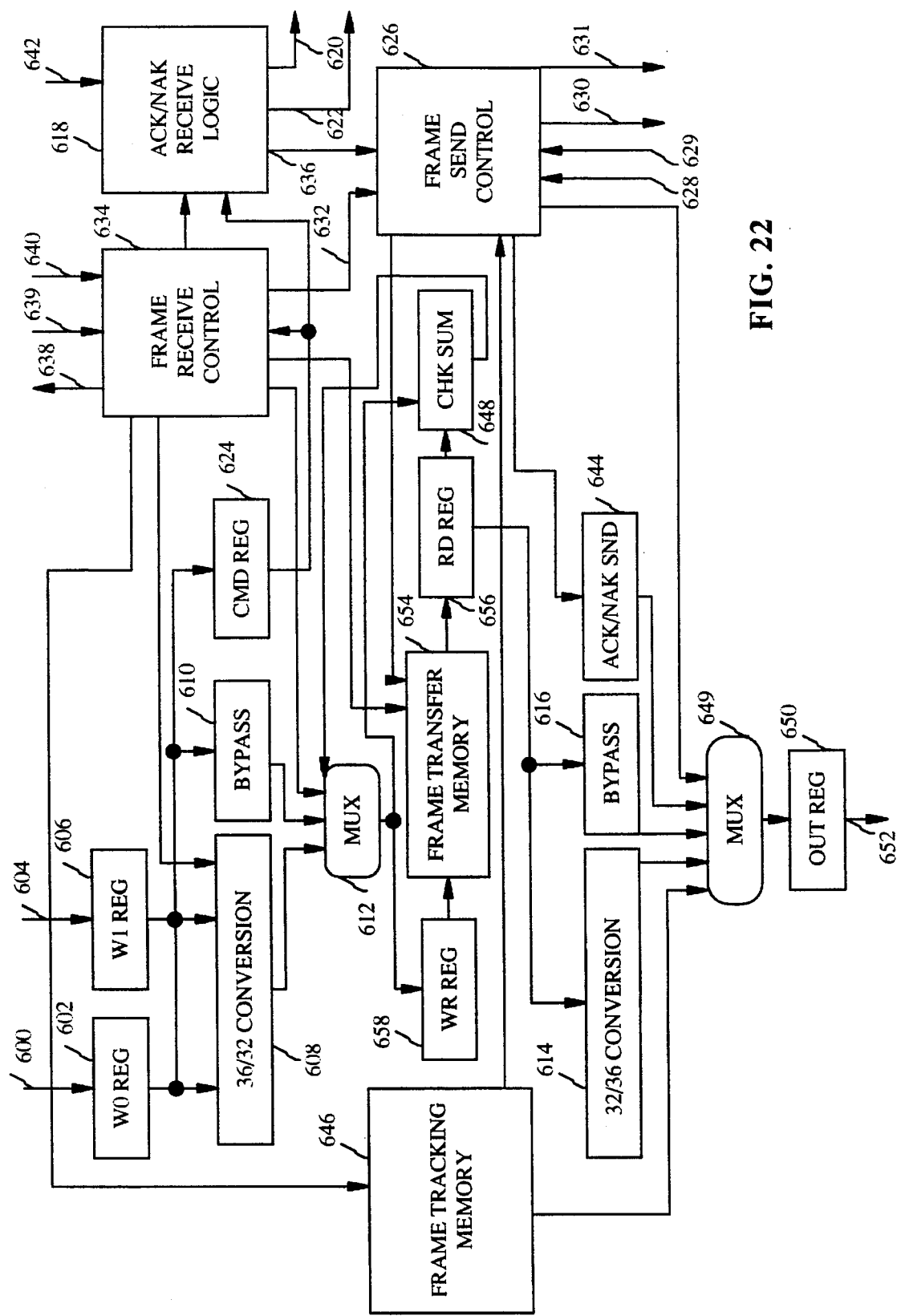
FIG. 22 is a block diagram of the Frame Transfer Facility gate array.

FIG. 22 is a block diagram of the Frame Transfer Facility gate array. The FXFA accepts HIA Status, DM Commands, or word 0 of DM Data on Line 600 and stores this information in Write Register 0 (W0 REG) 602. The FXFA accepts HIA Data, DM Commands, or word 1 of DM Data on Line 604 and stores this information in Write Register 1 (W1 REG) 606. The contents of both W0 REG 602 and W1 REG 606 are passed to 36/32 Conversion logic 608. This section of the FXFA is used on the DM 48 for transmission only, because it converts 36-bit data words obtained from the Host system 12 into 32-bit words used throughout the rest of the File Cache System 18.

Only data received from a DM 48 and destined for the Non-Volatile Storage (NVS) 70 is converted to 32-bit words. All other commands and messages are assumed to be 32 bits of data, right justified in the 36-bit input word. The four most significant bits are discarded. This data is passed through the Bypass Register 610 to Multiplexer (MUX) 612 instead of being converted. All input words are assumed to have a parity bit associated with each half word, for either 36-bit or 32-bit words. The FXFA uses all data bits and their parity bits to generate the parity for the converted word length.

The 32/36 Conversion logic 614 is employed only on the DM 48 in the receive FXFA position. On the HIA 52, all transmissions to and from both FXFAs are in 32-bit words. On the DM 48 however, the data in the REC FXFA frames must be converted from 32-bit words to 36-bit words for the M-Bus 46 transmission for eventual use by File Cache Handler Software 42. Status transfers from the HIA 52 to the DM 48 are assumed to be in 32-bit words, right justified into 36-bit format, and therefore do not need to be translated. On the HIA 52, no translation is ever needed. Instead, data is sent through the Bypass Register 616. Reconnect Status and single word ACK/NAK frames do not go into the frame buffers and therefore never get converted. They get re-routed into ACK/NAK Receive Logic 618 and are sent out of the FXFA on Lines 620 and 622, respectively.

The Command Register (CMD REG) 624 is the alternate path for Frame Control fields, ACKs, and NAKs. There is a Frame Control field decode (not shown) on the output of the CMD REG 624 that controls the flow of data per its contents. The CMD REG is only used in FXFA positions that receive data from the LPFC 132.

The Frame Send Control logic 626 is used to control the transmission of data out of the FXFA. This interface, shown as Lines 628, 629, 630, and 631 is used when the FXFA is writing data to the LPFC 132 or the M-Bus 46. The send interface of the FXFA becomes active and transmits data out of the FXFA when a frame becomes valid, i.e., completely filled or done being written.

The FXFA will throttle the data going out when a pause signal 628 is activated by the LPFC 132 or the M-Bus 46, the FXFA receives a transmit fatal NAK signal 629 from the LPFC 132, or an internal error is detected on the DM 48.

Two main signals control data transfer out of the FXFA. An Out Data Transfer line 630 stays active for the entire transfer of a frame, while an Out Data Valid signal 631, which indicates the cycle in which the data is valid, may go active and inactive many times in one frame transfer. When the Out Data Valid signal is inactive, it throttles the data coming out of the FXFA (the forward direction of the transfer).

Other signals input to the Frame Send Control logic 626 are the Frame Valid Control signal 632 received from the Frame Receive Control logic 634, and the Retransmit Frame signal 636 received from the ACF/NAK Receive logic 618.

The Frame Receive Control logic 634 of the FXFA is used to control the reception of data into the FXFA. The Frame Receive Control logic 634 is used when the FXFA is written to by either the LPFC 132 or the M-Bus 46. The reception of data by the FXFA is passive; it accepts dam upon request from the logic that drives it. This interface has sets of control signals 638, 639, and 640. The FXFA can throttle the data coming in by indicating no more frames are available by driving the Frame Available control signal 638 inactive. This signal goes inactive the first cycle that In Data Transfer 639 and In Data Valid control 640 signals are both active and the frame that is being filled is the last frame available. This signal remains inactive until a LPFC ACK frees another frame to be filled.

The two main signals that control data transfer into the FXFA are the In Data Transfer 639 and In Data Valid 640 signals. The In Data Transfer signal 639 stays active for the entire transfer of the frame, while the In Data Valid signal 640 indicates the cycle in which the data is valid, and may go active or inactive many times in one frame transfer. The In Data Valid signal 640, when inactive, throttles the data coming into the FXFA (the forward direction of the transfer).

The ACK/NAK Receive Logic 618 is used only on the REC FXFAs on both the DM 48 and the HIA 52. This logic receives all ACKs and NAKs over Line 642 for frames sent and generates all ACKs and NAKs for frames received. ACKs and NAKs for frames sent are responses from the FXFAs on the other end of the Fiber Optic Interface for frames they received. For all frames sent across the Fiber Optic Interface, ACKs or NAKs are expected in return. ACKs free up frames in the SEND FXFA for future use and NAKs require that the specified frame and all subsequent frames must be re-sent. ACKs and NAKs for flames received are the ACK and NAK data for flames coming off of the Fiber Optic Interface into the FXFA. These are generated as frames come into the REC FXFA and are sent to the SEND FXFA. The SEND FXFA then sends this ACK/NAK data to the other end of the Fiber Optic Interface to indicate the transfer was either successful or faulty.

The ACK/NAK Send logic (ACK/NAK SND) 644 controls the sending of ACKs and NAKs. All ACKs and NAKs are sent from the REC FXFA to the SEND FXFA, and ACKs/NAKs for frames received are sent across the Fiber Optic Link on the next frame break. Note that ACK/NAK frames themselves do not use a frame buffer in the Frame Transfer Memory 654. All ACKs for frames sent come into the SEND FXFA and free up Frame Tracking Memory 646 so those Frame Tracking Memory locations with Sequence Numbers equal to or less than the Sequence Number received in the ACK can be used for the transmission of other frames. NAKs cause the frame to be re-sent and do not free up Frame Tracking Memory 646 for that frame. ACKs and NAKs can be compressed, i.e., if an ACK or NAK is received, it is assumed to be for the frame with the Sequence Number equal to or less than the Sequence Number in the ACK or NAK frame. The Sequence Number sent with the ACK or NAK is the last good Sequence Number received on the other end of the Fiber Optic Interface.

The Frame Transfer Memory 654 is used to buffer up to 127 34-bit words for transmission to or reception from the LPFC 132. Each word consists of 32 bits of data and two bits of parity. The DM 48 or HIA 52 hosting the FXFA keeps track of the frame length and sends 126 32-bit words before it has to drop the In Data Transfer and In Data Valid signals for at least one cycle. The SEND FXFA inserts the check sum into the 127th frame location. The REC FXFA generates a new checksum covering the data and checksum received from the LPFC and writes this value into the 128th frame location. When the frame is read, the REC FXFA removes both checksums.

Frames are written by the DM 48 or HIA 52 hosting the FXFA and a Number Of Frames Busy Counter (not shown) increments when the frame is written. When a frame is full or done being written, a Valid flag for that frame is set. When the Valid flag is set, it means the frame is ready to be sent to the LPFC. After the frame has been sent to the LPFC, a Transmit flag is set and the Valid flag is cleared. The Transmit flag is cleared when the frame is successfully acknowledged by the other end of the Fiber Optic Interface. The frame cannot be used for another transfer until both of these flags are cleared. When a frame must be retransmitted because of the SEND FXFA received a NAK, the Valid flag is set again and the Transmit flag is cleared.

When all available frame buffer locations are busy, the Frame Available signal (not shown) goes inactive and the DM 48 or HIA 52 hosting the FXFA is forced to suspend the transfer once the last frame is filled. This assumes the DM or HIA is keeping track of the length of the frames and at the frame boundary, or when this transfer is complete, transmission is suspended until the Frame Available signal goes active again. It is also assumed that the In Data Transfer and In Data Valid signals coming into the FXFA will go inactive for a minimum of one cycle between frames and not go active again until one cycle after the Frame Available signal is re-activated.

The Frame Tracking Memory 646 serves two functions on the FXFA. First, it registers a Frame Control Word that is sent out as the first word to the LPFC 132 preceding every frame transmitted. Secondly, it stores the Frame Control Word in the event that a frame requires retransmission. The Frame Tracking Memory 646 is a 16-deep stack of 20-bit words that is written by the Frame Receive Control logic 634 and read by the Frame Send Control logic 626. On retransmission of a frame, the Frame Send Control logic 626 selects the proper frames and associated Frame Tracking Memory addresses when a NAK is received. Transmissions and retransmissions are done only by a SEND FXFA.

The Checksum (CHK SUM) logic 648 has two parts, an input checksum store and an output checksum compare. As the frame buffer is being loaded, a running checksum is kept and at the end of the transmission, the total checksum is stored in the last address of the new frame buffer plus one. When the frame is read out of the FXFA, a new checksum is generated covering the data and the checksum that was written in the frame. If this read checksum has any data bits set or does not have both parity bits set, an internal error will occur and the communications path between the FXFA and the LPFC or M-Bus is downed.

Dam is output from the FXFA through MUX 649, Output register (OUT REG) 650 to Line 652. Frame Transfer Memory 654, Read Register (RD REG) 656, and Write Register (WR REG) 658 are used as the frame buffer data path.

A system for reliable and efficient communications between a main processor and a peripheral processor has been defined. This dedicated, point-to-point fiber optic interface provides improved performance and better fault detection capabilities than previous I/O channel architectures. The preferred embodiment uses fiber optic links based on the FDDI standard, but not the complete and unwieldy implementation of the standard, to provide the speed necessary to relieve system bottlenecks for high-volume transaction processing computer systems.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for communicating data packets between a first processor and a second processor as ends of a dedicated point-to-point fiber optic interface comprising:

a plurality of fiber optic links, wherein each of said fiber optic links includes a first end and a second, opposite end;

a plurality of physical layer controller pairs, each of said physical layer controller pairs being connected a predetermined one of said plurality of fiber optic links, wherein each said physical layer controller pair includes a first physical layer controller connected to said first end of said predetermined one of said fiber optic links and a second physical layer controller connected to said second end of said predetermined one of said fiber optic links;

first frame control circuitry connected to said first physical layer controllers, and second frame control circuitry connected to said second physical layer controllers;

first frame sending circuitry connected to said first frame control circuitry and to the first processor, and second frame sending circuitry connected to said second frame control circuitry and to the second processor;

first frame receiving circuitry connected to said first frame control circuitry, said first frame sending circuitry and to the first processor, and second frame receiving circuitry connected to said second frame control circuitry, said second frame sending circuitry, and to the secured processor;

a system clock operating at a first frequency connected to said first and said second frame control circuitry, said first and said second frame sending circuitry, and said first and said second frame receiving circuitry; and a local clock operating at a second frequency connected to said first and said second frame control circuitry, and said physical layer controller pairs.

2. A system as in claim 1, wherein each of said fiber optic links comprises a send line and a receive line.

3. A system as in claim 1, wherein said first and said second frame control circuitry further include frame send pipeline circuitry.

4. A system as in claim 3, wherein said frame send pipeline circuitry further includes frame check sequence generation logic.

5. A system as in claim 3, wherein said frame send pipeline circuitry further includes an asynchronous First-In-First-Out buffer.

6. A system as in claim 1, wherein said first and said second frame control circuitry further include frame receive pipeline circuitry.

7. A system as in claim 6, wherein said frame receive pipeline circuitry further includes frame check sequence verification logic.

8. A system as in claim 6, wherein said frame receive pipeline circuitry further includes an asynchronous First-In-First-Out buffer.

9. A system for communicating data packets between a first processor and a second processor as ends of a dedicated point-to-point fiber optic interface comprising:

a plurality of fiber optic links, each of said fiber optic links includes a first end and a second, opposite end;

a plurality of physical layer controller pairs, each of said physical layer controller pairs being connected to a predetermined one of said plurality of fiber optic links, wherein each said physical layer controller pair includes a first physical layer controller connected to said first end of said predetermined one of said fiber optic links and a second physical layer controller connected to said second end of said predetermined one of said fiber optic links;

first and second frame control means for synchronizing, reformatting, encoding and decoding, and transmitting said data packets to said physical layer controllers, said first frame control means being connected to said first physical layer controllers, and said second frame control means being connected to said second physical layer controllers;

first frame sending means for receiving data packets from the first processor, buffering the data packets, and transmitting the data packets to said first frame control means, said first frame sending means being connected to the first processor and to said first frame control means;

second frame sending means for receiving data packets from the second processor, buffering the data packets, and transferring the data packets to said second frame control means, said second frame sending means being connected to the second processor and to said second frame control means;

first frame receiving means for receiving data packets from said first frame control means, buffering the data packets, transferring the data packets to the first processor, and sending an acknowledgment signal to said first frame sending means, said first frame receiving means being connected to said first frame control means, said first frame sending means, and to the first processor;

second frame receiving means for receiving data packets from said second frame control means, buffering the data packets, transferring the data packets to the second processor, and sending an acknowledgment signal to said second frame sending means, said second frame receiving means being connected to said second frame control means, said second frame sending means, and to the second processor;

a system clock operating at a first frequency connected to said first and said second frame control means, said first and said second frame sending means, and said first and said second frame receiving means; and a local clock operating at a second frequency connected to said first and said second frame control means, and said physical layer controller pairs.

10. A system as in claim 9, wherein the first processor is a main processor and the second processor is a peripheral processor.

11. A system as in claim 9, wherein each of said first and second frame control means comprises:

frame send pipeline means, connected said to frame sending means and said physical layer controllers, for receiving data packets from said frame sending means, resynchronizing the date packets to said local clock, reformatting the date packets into frames, and transferring said frames to said physical layer controllers; and frame receive pipeline means, connected to said frame receiving means and said physical layer controllers, for receiving frames from said physical layer controllers, reformatting said frames into data packets, performing error checking on the data packets, resynchronizing the data packets to said system clock, and transferring the data packets to said frame receiving means.

12. A system as in claim 11, wherein said frame send pipeline means further includes frame check sequence generation means for generating a frame check sequence inserting said frame check sequence into the data packets.

13. A system as in claim 12, wherein said frame check sequence generation means generates said frame check sequence according to the FDDI standard polynomial.

14. A system as in claim 11, wherein said frame send pipeline means further includes buffer means for temporarily storing data packets while the data packets are resynchronized from said system clock to said local clock.

15. A system as in claim 11, wherein said frame send pipeline means further includes history queue means for temporarily storing data packets for future retransmission.

16. A system as in claim 11, wherein said frame receive pipeline further includes frame check sequence verification means for comparing said frame check sequence received in the data packets with a new frame check sequence generated by said frame receive pipeline from the data packets.

17. A system as in claim 11, wherein said frame receive pipeline means further includes buffer means for temporarily storing data packets while the data packets are resynchronized from said local clock to said system clock.

18. A system as in claim 9, wherein said system communicates data packets in a full-duplex, asynchronous mode of operation.

19. A system as in claim 9, wherein said frame receiving means and said frame sending means process compressed acknowledgement signals.

20. A system as in claim 9, wherein said plurality of physical layer controller pairs is two and said physical layer controller pairs operate in a cascaded mode of operation.

21. A system as in claim 20, said first and second frame control means further including means for segregating and transferring even-numbered bytes and odd-numbered bytes of the data packets wherein the even-numbered bytes of the data packets are transferred between said first physical layer controller and said second physical layer controller of a first physical layer controller pair and the odd-numbered bytes of the data packets are transferred between said first physical layer controller and said second physical layer controller of a second physical layer controller pair, said even-numbered bytes and said odd-numbered bytes being transferred in parallel.

22. A method of sending data packets from a first processor to a second processor over a dedicated point-to-point fiber optic interface including two fiber optic links, each of the fiber optic links including a first end and a second, opposite end, further including a first and second physical layer controller pairs, each of the physical layer controller pairs being coupled to a predetermined one of fiber optic links, wherein each physical layer controller pair includes a first physical layer controller coupled to the first end of the predetermined one of the fiber optic links, and a second physical layer controller coupled to the second end of the predetermined one of the fiber optic links, comprising the steps of:

(a) accepting a data packet from the first processor for transmission to the second processor;

(b) reformatting the data packet and resynchronizing the data packet from a system clock operating at a first frequency to a local clock operating at a second frequency;

(c) sending the even bytes of the data packet from the first physical layer controller of the first physical layer controller pair on the first end of the fiber optic interface to the second physical layer controller of the first physical layer controller pair on the second end of the fiber optic links, and sending the odd bytes of the data packet from the first physical layer controller of the second physical layer controller pair on the first processor end of the fiber optic interface to the second physical layer controller of the second physical layer controller pair on the second processor end of the fiber optic links, said even and said odd bytes being sent in parallel;

(d) receiving said even and said odd bytes of the data packet, reformatting said even and said odd bytes of the data packet and resynchronizing the data packet from said local clock operating at said second frequency to said system clock operating at said first frequency; and (e) providing the data packet to the second processor.

* * * * *